US008221220B2

(12) United States Patent
Ackley et al.

(10) Patent No.: US 8,221,220 B2
(45) Date of Patent: Jul. 17, 2012

(54) METHOD AND/OR SYSTEM FOR ADAPTIVE GAMING EXPERIENCE

(75) Inventors: Jonathan Ackley, Glendale, CA (US); Jonathan Blossom, Charleston, SC (US); Charles Ryan Jordan, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 892 days.

(21) Appl. No.: 11/833,151

(22) Filed: Aug. 2, 2007

(65) Prior Publication Data

US 2008/0039204 A1 Feb. 14, 2008

Related U.S. Application Data

(60) Provisional application No. 60/837,151, filed on Aug. 11, 2006, provisional application No. 60/837,149, filed on Aug. 11, 2006, provisional application No. 60/837,150, filed on Aug. 11, 2006, provisional application No. 60/837,111, filed on Aug. 11, 2006.

(51) Int. Cl.
*A63F 9/24* (2006.01)
*A63F 13/00* (2006.01)

(52) U.S. Cl. .............. 463/23; 463/29; 463/30; 463/31; 463/36; 463/39; 463/42

(58) Field of Classification Search ............... 463/9, 23, 463/29, 30, 40, 42, 46, 47, 39
See application file for complete search history.

(56) References Cited

U.S. PATENT DOCUMENTS

| 5,434,904 | A | * | 7/1995 | Tsuzuki et al. | 455/456.3 |
|---|---|---|---|---|---|
| 5,613,913 | A | * | 3/1997 | Ikematsu et al. | 463/52 |
| 5,830,065 | A | * | 11/1998 | Sitrick | 463/31 |
| 6,287,200 | B1 | * | 9/2001 | Sharma | 463/40 |
| 6,352,478 | B1 | * | 3/2002 | Gabai et al. | 463/42 |
| 6,527,641 | B1 | * | 3/2003 | Sinclair et al. | 463/39 |
| 6,761,637 | B2 | * | 7/2004 | Weston et al. | 463/42 |
| 6,773,344 | B1 | * | 8/2004 | Gabai et al. | 463/1 |
| 6,813,608 | B1 | * | 11/2004 | Baranowski | 705/6 |
| 6,967,566 | B2 | * | 11/2005 | Weston et al. | 340/323 R |
| 7,112,138 | B2 | | 9/2006 | Hendrick et al. | |
| 7,212,983 | B2 | | 5/2007 | Redmann et al. | |
| 7,383,316 | B2 | * | 6/2008 | Koch et al. | 709/217 |
| 7,398,151 | B1 | * | 7/2008 | Burrell et al. | 701/200 |
| 7,488,231 | B2 | * | 2/2009 | Weston | 446/175 |
| 7,614,958 | B2 | * | 11/2009 | Weston et al. | 473/62 |
| 7,749,089 | B1 | * | 7/2010 | Briggs et al. | 472/136 |
| 8,014,768 | B2 | | 9/2011 | Ackley | |
| 2001/0034257 | A1 | * | 10/2001 | Weston et al. | 463/1 |

(Continued)

FOREIGN PATENT DOCUMENTS

WO WO 9908762 A1 * 2/1999

OTHER PUBLICATIONS

Response to Final Office Action filed May 26, 2010 in co-pending U.S. Appl. No. 11/833,161, 30 pages.

(Continued)

*Primary Examiner* — Steven J Hylinski
(74) *Attorney, Agent, or Firm* — Samuel K. Simpson; Patent Ingenuity, P.C.

(57) ABSTRACT

The subject matter disclosed herein relates to systems for providing an interactive experience to game participants.

32 Claims, 8 Drawing Sheets

U.S. PATENT DOCUMENTS

| | | | |
|---|---|---|---|
| 2002/0047861 A1 | 4/2002 | LaBrie et al. | |
| 2002/0198003 A1* | 12/2002 | Klapman | 455/456 |
| 2003/0125042 A1* | 7/2003 | Olrik et al. | 455/456 |
| 2004/0044725 A1 | 3/2004 | Bell et al. | |
| 2004/0082384 A1* | 4/2004 | Walker et al. | 463/40 |
| 2004/0097285 A1* | 5/2004 | Fisher et al. | 463/24 |
| 2004/0162142 A1* | 8/2004 | Cousineau et al. | 463/41 |
| 2004/0180674 A1* | 9/2004 | Blomqvist et al. | 455/456.5 |
| 2004/0259537 A1 | 12/2004 | Ackley | |
| 2005/0045710 A1* | 3/2005 | Burke | 235/375 |
| 2005/0049022 A1* | 3/2005 | Mullen | 463/1 |
| 2005/0132016 A1* | 6/2005 | Boone | 709/207 |
| 2005/0143173 A1* | 6/2005 | Barney et al. | 463/37 |
| 2005/0153729 A1* | 7/2005 | Logan et al. | 455/550.1 |
| 2005/0221808 A1* | 10/2005 | Karlsson et al. | 455/418 |
| 2005/0256782 A1* | 11/2005 | Sands et al. | 705/26 |
| 2006/0004512 A1 | 1/2006 | Herbst et al. | |
| 2006/0030385 A1* | 2/2006 | Barney et al. | 463/9 |
| 2006/0063539 A1* | 3/2006 | Beyer, Jr. | 455/456.3 |
| 2006/0089792 A1* | 4/2006 | Manber et al. | 701/207 |
| 2006/0097866 A1* | 5/2006 | Adamczyk et al. | 340/539.13 |
| 2006/0111126 A1* | 5/2006 | Chithambaram | 455/456.5 |
| 2006/0121917 A1* | 6/2006 | Shin | 455/456.5 |
| 2006/0123053 A1* | 6/2006 | Scannell, Jr. | 707/104.1 |
| 2006/0154726 A1 | 7/2006 | Weston et al. | |
| 2006/0166740 A1* | 7/2006 | Sufuentes | 463/40 |
| 2006/0173612 A1* | 8/2006 | Steel | 701/207 |
| 2006/0179127 A1* | 8/2006 | Randall | 709/219 |
| 2008/0039205 A1 | 2/2008 | Ackley | |
| 2008/0039206 A1* | 2/2008 | Ackley et al. | 463/40 |
| 2008/0058059 A1* | 3/2008 | Fitzsimons et al. | 463/20 |

OTHER PUBLICATIONS

Advisory Action mailed Jun. 21, 2010 in co-pending U.S. Appl. No. 11/833,161, 6 pages.
Notice to File Missing Parts mailed Aug. 15, 2007 in co-pending U.S. Appl. No. 11/833,171, 2 pages.
Response to Notice to File Missing Parts filed Oct. 15, 2007 in co-pending U.S. Appl. No. 11/833,171, 7 pages.
Interview Summary mailed Jun. 5, 2009 in co-pending U.S. Appl. No. 11/833,171, 4 pages.
Response to Final Office Action filed Apr. 20, 2010 in co-pending U.S. Appl. No. 11/833,171, 31 pages.
Advisory Action mailed Apr. 29, 2010 in co-pending U.S. Appl. No. 11/833,171, 6 pages.
Notice to File Missing Parts mailed Aug. 13, 2007 in co-pending U.S. Appl. No. 11/833,141, 2 pages.
Response to Notice to File Missing Parts filed Oct. 15, 2007 in co-pending U.S. Appl. No. 11/833,141, 15 pages.
Response to Office Action filed Dec. 4, 2009 in co-pending U.S. Appl. No. 11/833,141, 21 pages.
Final Office Action mailed Mar. 9, 2010 in co-pending U.S. Appl. No. 11/833,141, 11 pages.
Response to Final Office Action filed Jun. 3, 2010 in co-pending U.S. Appl. No. 11/833,141, 37 pages.
Advisory Action mailed Jun. 21, 2010 in co-pending U.S. Appl. No. 11/833,141, 6 pages.
Office action mailed Oct. 19, 2009 in U.S. Appl. No. 11/833,161, 13 pages.
Amendment filed Oct. 30, 2009 in U.S. Appl. No. 11/833,171, 27 pages.
Patent Application filed Aug. 3, 2007 in co-pending PCT Patent Application No. PCT/US07/75184, 60 pages.
Notification Concerning Availability of the Publication of the International Application mailed Feb. 21, 2008 in co-pending PCT Patent Application No. PCT/US07/75184, 1 page.
Amendment Under Article 19 filed Nov. 14, 2008 in co-pending PCT Patent Application No. PCT/US07/75184, 4 pages.
Notification Concerning Availability of the Publication of the International Application mailed Nov. 20, 2008 in co-pending PCT Patent Application No. PCT/US07/75184, 1 page.
Notification Concerning the Filing of Amendments of the Claims mailed Jan. 7, 2009 in co-pending PCT Patent Application No. PCT/US07/75184, 1 page.
Notification Concerning Availability of the Publication of the International Application mailed Feb. 19, 2009 in co-pending PCT Patent Application No. PCT/US07/75184, 1 page.
Notification Concerning Transmittal of International Preliminary Report on Patentability (Chapter 1 of the Patent Cooperation Treaty) mailed Feb. 26, 2009 in co-pending PCT Patent Application No. PCT/US07/75184, 9 pages.
Response filed Jan. 19, 2010 in U.S. Appl. No. 11/833,161, 17 pages.
Final Office action mailed Feb. 24, 2010 in U.S. Appl. No. 11/833,171, 15 pages.
Notice to File Missing Parts mailed Aug. 14, 2007 in co-pending U.S. Appl. No. 11/833,161, 2 pages.
Response to Notice to File Missing Parts filed Oct. 15, 2007 in co-pending U.S. Appl. No. 11/833,161, 7 pages.
Final Office Action mailed Mar. 24, 2010 in co-pending U.S. Appl. No. 11/833,161, 15 pages.
Co-pending U.S. Appl. No. 11/833,141, filed Aug. 2, 2007, 62 pages.
Non-Final Office action in co-pending U.S. Appl. No. 11/833,161, mailed Sep. 25, 2008, 14 pages.
Non-Final Office action in co-pending U.S. Appl. No. 11/833,171, mailed Sep. 3, 2008, 9 pages.
Notification of Transmittal of the International Search Report and Written Opinion, Application No. PCT/US07/75184, mailed Sep. 16, 2008, 12 pages.
Dennis, Tony "Botfighters—a new Russian addiction"—The Inquirer, Published by Incisive Media Investments Ltd., 5 pages, Oct. 21, 2003.
PRIX ARS Electronica 2002, Ars Electronica Linz GmbH, Impressum, info@aec.at, 1 page, 2002.
The Curse of Monkey Island, Developed and Published by LucasArts, 3 pages, http://en.wikipedia.org/wiki/The_Curse_of_Monkey_Island, online site was last modified Aug. 30, 2008.
Monkey Island 3: The Curse of Monkey Island, developed and published by LucasArts, 3 pages, Aug. 13, 2001.
Linkola, Joonas, The Curse of Monkey Island, 3 pages, Mar. 11, 2006.
McHugh, Josh, "The Great Escape", WWW.WIRED.COM, 2 pages, Mar. 2006.
Terdiman, Daniel, "I Love Bees Game a Surprise Hit", www.wired.com, 2 pages, Oct. 18, 2004.
I Love Bees, from Wikipedia, 3 pages, http://en.wikipedia.org/wiki/I_Love_Bees, online site last modified Sep. 20, 2008.
Halling, Sven, "Pervasive Gaming", PowerPoint Presentation, 15 pages, Jan. 7, 2003.
Schmidt et al., "JaGD—An Photo Oriented Learning and Gaming Platform for Mobile Devices", Embedded Interaction Group, 2 pages, 2005.
Myst, from Wikipedia, 5 pages, retrieved from http://en.wikipedia.org/wiki/myst, online site last modified Sep. 20, 2008.
Magi Quest, http://www.creativekingdoms.com/magiquestPR.thml, 3 pages, Myrtle Beach, SC, Jun. 2005.
Response to Non-final Office action in co-pending U.S. Appl. No. 11/833,161, filed Jan. 26, 2008, 20 pages.
Response to Restriction Requirement filed Jun. 15, 2009 in co-pending U.S. Appl. No. 11/833,141, 19 pages.
Request for Continued Examination and Amendment mailed Sep. 14, 2009 in co-pending U.S. Appl. No. 11/833,161, 23 pages.
Office action mailed Sep. 4, 2009 in co-pending U.S. Appl. No. 11/833,141, 14 pages.
Office action mailed Aug. 14, 2009 in co-pending U.S. Appl. No. 11/833,171, 12 pages.
Riggs, Larry, "Caught on Camera", Creative Visions Foundation, Penton Media, Inc., from www.directmag.com/mag/marketing_caught_camera, published May 15, 2001, 2 pages.
Office action: Restriction Requirement mailed May 14, 2009 in co-pending U.S. Appl. No. 11/833,141, 8 pages.
Final Office action mailed May 14, 2009 in co-pending U.S. Appl. No. 11/833,161, 14 pages.
Response filed Dec. 3, 2008 in co-pending U.S. Appl. No. 11/833,171, 22 pages.
Final Office action mailed Feb. 9, 2009 in co-pending U.S. Appl. No. 11/833,171, 14 pages.

Response After Final filed Apr. 9, 2009 in co-pending U.S. Appl. No. 11/833,171, 22 pages.
Advisory action mailed May 4, 2009 in co-pending U.S. Appl. No. 11/833,171, 3 pages.
RCE and Amendment filed Jun. 9, 2009 in co-pending U.S. Appl. No. 11/833,171, 27 pages.
Notice of Appeal as Filed Jul. 15, 2010 in co-pending U.S. Appl. No. 11/833,161, 3 pages.
Examiner's answer to appeal brief mailed Dec. 20, 2010 for U.S. Appl. No. 11/833,141, 16 pages.
Appeal brief mailed Nov. 8, 2010 for U.S. Appl. No. 11/833,141, 45 pages.
Examiner's answer to appeal brief mailed Jan. 6, 2011 for U.S. Appl. No. 11/833,161, 20 pages.
Interview summary mailed Dec. 28, 2010 for U.S. Appl. No. 11/833,171, 3 pages.
Office Action mailed Nov. 26, 2010 for U.S. Appl. No. 11/833,171, 15 pages.

* cited by examiner

METHOD AND/OR SYSTEM FOR ADAPTIVE GAMING EXPERIENCE

This application claims the benefit of U.S. Provisional Application Nos. 60/837,151; 60/837,149; 60/837,150 and 60/837,111, all filed on Aug. 11, 2006.

BACKGROUND

1. Field:

The subject matter disclosed herein relates to systems and methods for providing an interactive gaming experience.

2. Information:

Computing and network communication technology enable game participants to interact with one another and their environment as part of an interactive game experience. Game participants may interact with a user interface of a computing platform hosting one or more applications capable of providing a media-rich game experience. Such computing platforms may be connected to other devices through a data communication network to affect a gaming experience in response to real-time events. For example, a game participant's computing platform may communicate with a server to obtain additional information. The computing platform may process this additional information to provide an interactive experience. Alternatively, in a multi-participant game, a game participant's computing platform may deliver an interactive game experience to the game participant based on information received from another participant's computing platform.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In particular embodiments illustrated herein, participants in an interactive game may physically move about in a gaming environment to interact with one another, machines, audio visual devices, sensors and/or the like. For instance, a gaming area over a geographical region may be populated with one or more interactive installations to, among other things, provide special effects to be experienced by such participants. Such special effects may be generated in response to actions taken by the participants and/or associated game states.

According to an embodiment, a game experience provided to participants in a gaming area may be altered and/or adjusted in response to feedback information. In one embodiment, such a game experience for a particular participant may be altered and/or tailored according to specific attributes of the particular participant. Alternatively, such a gaming experience may be tailored and/or altered in response to dynamic conditions.

According to an embodiment, an interactive gaming system may provide an interactive gaming experience to one or more "game participants" ("game participant" is to be used interchangeably herein with "participant"). In one particular embodiment a game participant may interact with an interactive gaming system through one or more "mobile devices" which are capable of communicating with one or more other elements of the interactive gaming system over a communication network. Here, such a mobile device may comprise a computing platform comprising communication adapter to transmit information between applications hosted on the mobile device and other elements of the interactive gaming system using, for example, a wireless communication protocol. In particular embodiments, a mobile device may comprise a general-purpose device such as a mobile telephone, personal digital assistant (PDA), notebook computer, and/or the like. Alternatively, a mobile device may comprise a special-purpose device such as jewelry, a pin, a bracelet, a handheld device, a computing platform embedded in a garment a vehicle, and/or the like.

In accordance with particular embodiments, an interactive gaming system comprises one or more interactive installations provided at one or more locations over a geographical area. In one embodiment, such interactive installations may receive information from a game participant and/or mobile device co-located with the game participant at one or more sensors. Additionally, an interactive installation may provide a response to game participants as part of an interactive experience.

Figure 1A:
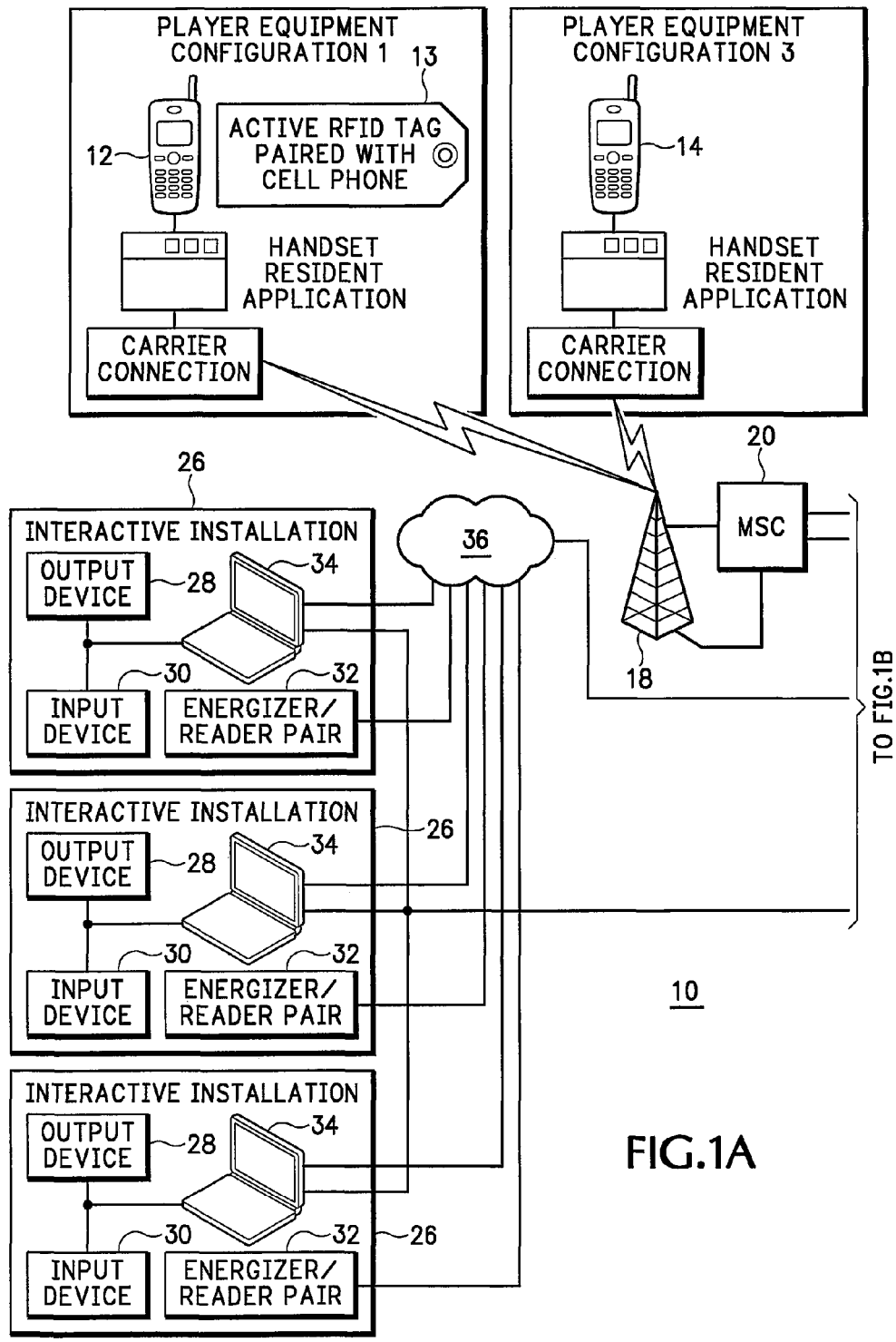
FIGS. 1A and 1B comprise a schematic diagram of a system to provide an interactive gaming experience to game participants according to an embodiment.
Figure 1B:
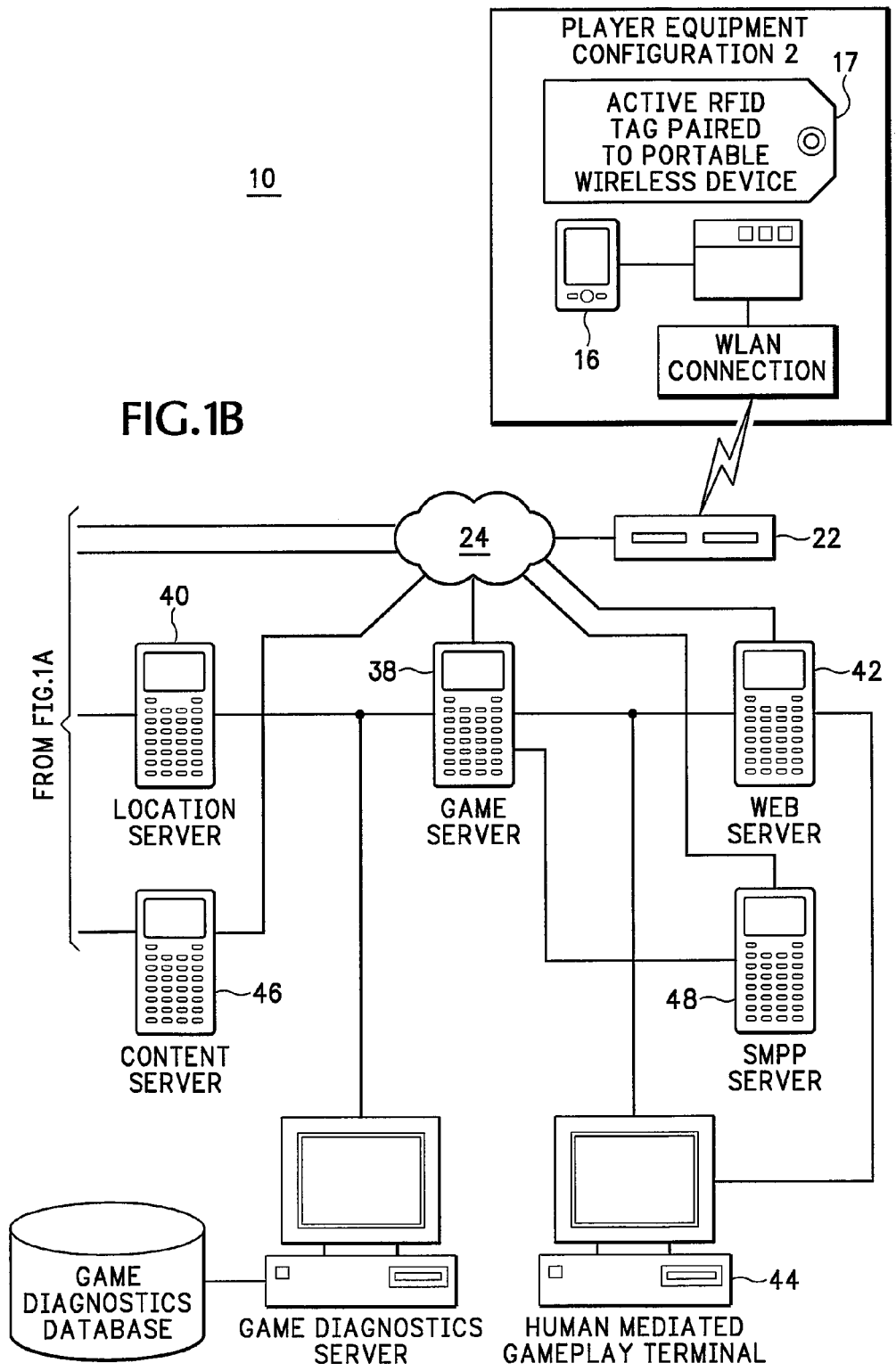

FIGS. 1A and 1B provide a schematic diagram of a system 10 configured to provide an interactive gaming experience to game participants according to an embodiment. In the particular implementation of FIGS. 1A and 1B, game participants associated with mobile devices (e.g., mobile devices 12, 14 or 16) participate in a gaming experience at interactive installations 26 controlled, at least in part, by a game server 38. Interactive installations 26 may be dispersed over a geographical area such as that of a theme or amusement park. In other embodiments interactive installations may be dispersed over a geographical area such as a neighborhood, school or business campus, convention center, theatre complex, town, metropolitan area, political subdivision such as a city, state or nation, just to name a few examples.

According to an embodiment, a game participant may travel to different interactive installations 26 while carrying a mobile device 12, 14 or 16 to communicate with game server 38, web server 42 and/or content server 46 to receive a gaming experience based, at least in part, on a "game state" associated with the game participant. Such a gaming experience may also be tailored to locations of a participant during game-play.

According to an embodiment, a game participant and/or an associated mobile device 12/14/16 may be associated with one or more game states in which the mobile device 12/14/16 may progress through multiple game states while delivering an interactive gaming experience to the participant. For example, a gaming experience may comprise a puzzle which is solvable by correctly answering or solving a series of riddles or problems. Upon responding to such a riddle and/or problem, a participant and/or the participant's mobile device may advance to a subsequent game state where, for example, a new riddle and/or problem may be presented. The subsequent game state may be selected based in part on the participant's response. For example, the subsequent game state may be selected as a first game state when the response is correct and a second game state when the response is incorrect. Alternatively, or in addition, the participant's response may indicate a participant's choice and the subsequent game state is determined in part by that choice.

Game state may be represented by any number of variables that are relevant to a particular game. For example, game state may include a measure of strength, wisdom, experience, tools collected, and/or the like. Game state may comprise, or be based upon, participant specific attributes such as, for example, age, birth date, gender, personal preferences, handicap status, and/or the like. Here, for example, such attributes may be represented by information maintained by a game server as metadata associated with a particular participant which, in particular embodiments, may be forwarded to an interactive installation 26 in response to detection of a presence of the particular participant at the interactive installation 26.

Components of game state may be affected by a player's behavior as the player interacts with the game. A game state may also be characterized by particular actions that are enabled at that particular game state, as well as information that is presented to the participant(s) in that game state. Here, for example, a particular game state may determine actions that a particular associated game participant may take or functions that may be available using a mobile communication device. Game state may also be affected by variables such as progress, or lack of progress, through various stages of a multi-stage game. In a multiplayer game, a game state associated with a particular participant may include a measure of one or more of the aforementioned variables as applied to other participants in the game. For example, a game state associated with a particular participant in a multiplayer game may be based, at least in part, on progress or lack of progress of other participants in the game.

A game state may also include, or be based upon, environmental variables that quantify physical and virtual environmental variables that affect game play, and may quantify the state of virtual characters or avatars. In one particular embodiment, a game experience may be provided to a game participant as an associated game state progresses. Here, such game state may progress as one or more variables affecting the game state change over time.

According to an embodiment, game server 38 and/or content server 46 communicates with one or more interactive installations 26 and/or mobile devices 12/14/16 to provide an interactive gaming experience to a game participant. For example, game content server 46 provides information to an interactive installation 26 and/or applications hosted on a mobile device for presentation to a game participant in an audible and/or visual format. Also, game server 38 may receive information from a mobile device 12/14/16 and/or interactive installation 26, and communicate with one or more mobile devices 12/14/16 and/or interactive installations 26 to affect a gaming experience for one or more interactive game participants.

A mobile device 12/14/16 and/or game participant may be associated with a "location" comprising information associated with a whereabouts of such a mobile device 12/14/16 and/or game participant according to a point of reference. For example, such a location may be represented as geographic coordinates such as latitude and longitude. Location may represent proximity to an interactive installation 26 or simply that a mobile device is able to communicate with a particular interactive installation 26. Alternatively, such a location may be represented as a proximity to a particular geographic reference point or landmark, street address, municipality or other political subdivision, postal zip code and/or the like. According to an embodiment, game server 38 affects an interactive gaming experience for a game participant at a mobile device 12/14/16 based, at least in part, on a game state associated with the mobile device 12/14/16 and/or a location of the mobile device 12/14/16. For example, while a mobile device 12/14/16 and/or participant is in proximity to a particular interactive installation 26 and a particular game state exists, game server 38 communicates with the particular interactive installation 26 in a manner that is compatible with the particular game state and/or location. For example, such a communication from game server 38 may comprise a command to provide one or more special effects to a game participant located at the interactive installation 26. Similarly, game server 38 may communicate with the particular mobile device 12/14/16 at the particular game state for transitioning to a subsequent game state that is compatible with being in such proximity to the particular interactive installation 26.

An interactive installation 26 may comprise an input device 30 to receive stimuli from game participants, an output device 28 to provide stimuli and an effects controller 34 to integrate input device 30 and output device 28 with other elements of gaming system 10. Output device 28 may comprise one or more devices capable of providing sensory stimuli to an interactive game participant including, for example, visual displays, audio output devices, electromechanically controlled devices (e.g., animated robots, door/window openers, force feedback, air jets, liquid sprays, scent sprays, vending machine access, activating a locking device to open/close a lock, and/or the like). Here, such an output device 28, by itself and/or in combination with other output devices 28, may provide special effect that may be experienced by a game participant at or in proximity to the interactive installation 26. Such a special effect may be initiated and/or controlled by commands from game server 38, for example.

Input device 30 may comprise one or more devices capable of receiving information specific to the location of interactive installation 26 including devices such as microphones, cameras, environmental sensors (e.g., light, temperature, vibration and moisture), electro-mechanical switches and/or actuators. Interactive installation 26 may exist at a fixed location in the game environment, or may be mobile such that its position changes during game play. Interactive installation 26 may be manned or unmanned. In some cases interactive installation 26 may be integrated with a character costume. Effects controller 34 may comprise a computing platform which is adapted to communicate with input device 30 and output device 28 as peripheral devices over standard or special-purpose peripheral device interfaces. Examples of standard interfaces include Universal Serial Bus (USB), Firewire, Bluetooth, wireless communication protocols and/or the like. Here, special effects controller 34 may perform signal processing, data compression/decompression, data encoding/decoding of information to be transmitted between interactive installation 26 and game server 38 and/or content server 46. Effects controller 34 may also comprise a communication adapter to communicate with game server 38 and/or content server 46 over standard communication protocols such as TCP/IP and over data links provided according to versions of IEEE Std. 802.3, IEEE Std. 802.11 and/or the like.

According to an embodiment, an interactive installation 26 may also comprise a radio frequency identification (RFID) energizer/reader pair 32 capable of detecting the presence of an RFID device 13/17, which is co-located with a game participant. When energizer/reader pair 32 detects a presence of RFID device 13/17 in proximity to interactive installation 26 (e.g., from RFID device 13/17 being within a detection range), energizer/reader pair 32 may extract an RFID code from a received signal that is associated with an identity of a particular game participant. With an interactive installation 26 being positioned at a known geographical location (e.g., at an amusement park), detection of such an RFID code associated with an identity of a game participant may be used to approximate the location of the game participant at the known geographical location of interactive installation 26.

Since RFID device 13/17 may be carried and/or worn by a game participant, according to a particular embodiment, a location of RFID device 13/17 may be assumed to be the location of the game participant. Similarly, since such a game participant may also carry a mobile device 12/14/16, it follows that a location of the mobile device 12/14/16 may be assumed to be the same as that of the RFID device 13/17 and game participant.

According to an embodiment, location server 40 maintains and updates information indicating locations of game participants and/or mobile devices 12/14/16 associated with game participants in an interactive gaming site. Here, for example, location server 40 may access and update a database (not shown) associating game participants with location information. Such location information may comprise, for example, a last known or approximated location of participants associated in records with information uniquely identifying the participants. Such location information may be expressed as, for example, geographical coordinates (e.g., latitude and longitude or other geocode) or proximity to particular points of interest such as particular interactive installations 26. Location server 40 may update location information associated with a game participant in response to any one of several events such as, for example, a detection at an interactive installation 26 positioned at a known location of an RFID device 13/17, of a barcode signature of a barcode label co-located with a participant and/or mobile device 12/14/16 or of a biometric signature associated with a participant. Alternatively, if a game participant co-located with mobile device 16 is communicating with a wireless access point 22 positioned at an interactive installation 26, location server 40 may update location information based upon an association of the mobile device 16 with the location of the wireless access point 22. Here, for example, location server 40 may make such an association of mobile device 16 and wireless access point 22 based, at least in part, on information (e.g., including information uniquely identifying mobile device 16 and/or wireless access point 22) in data packets received from mobile device 16 through wireless access point 22. Similarly, if mobile device 16 and wireless access point 22 have Bluetooth communication capabilities, location server 40 may make such an association of mobile device 16 and wireless access point 22 based, at least in part, on detection of a MAC address uniquely associated with mobile device 16 at wireless access point 22. In another alternative, a game participant's location may be determined from a photograph taken by the game participant and forwarded electronically. Using image recognition, one or more visual elements in the photograph may be associated with a location such as an interactive installation 26. In yet another alternative, a mobile device 12/14/16 may determine its location from receipt of signals such as signals transmitted by GPS satellites and/or other radio frequency signals and transmit a message to location server 40 indicating such a determined location.

Figure 2A:
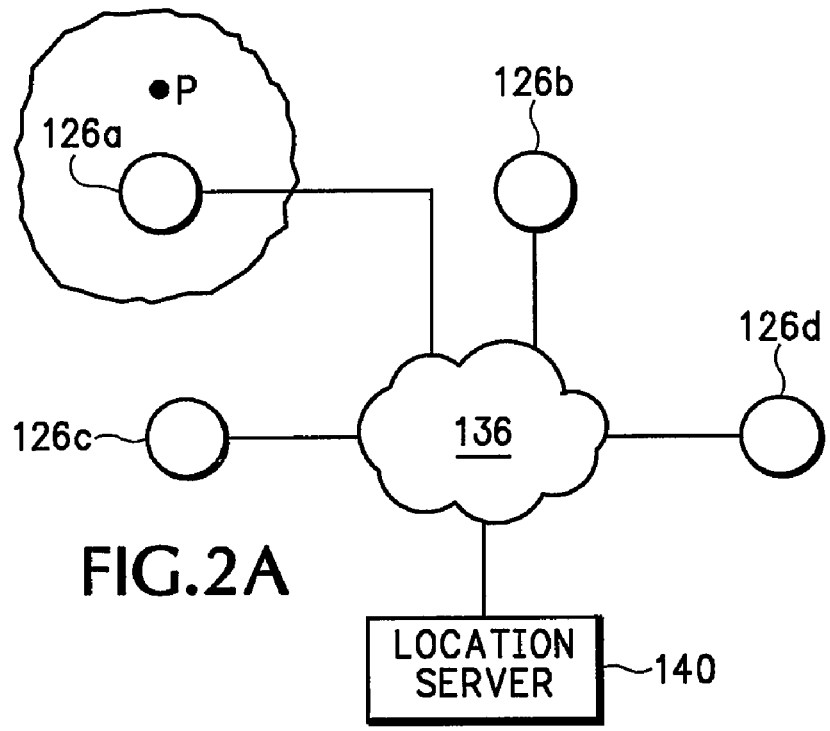
FIG. 2A is a schematic diagram illustrating determination of a location of a mobile device in an interactive gaming environment according to an embodiment.

In one embodiment, location server 40 may maintain records of associating signatures (e.g., RFID codes, biometric signatures and/or barcode signatures) with particular game participants. In one particular implementation, location server 40 may comprise location server 140 as shown in FIG. 2A. Here, interactive installations 126$_a$ through 126$_d$ may be dispersed over a gaming site and positioned at known locations. As participant P approaches interactive installation 126$_a$, an RFID energizer/reader pair (not shown) co-located with interactive installation 126$_a$ may receive a signal from an RFID device 13/17 associated with and attached to and/or co-located with participant P. Here, the RFID energizer/reader pair may demodulate the received signal to provide an RFID code that is associated with P in a database maintained by location server 140. Upon receipt of a message from interactive installation 126$_a$ of detection of the signal carrying the particular RFID code, the location server 140 may associate the particular RFID code with participant P, and deduce that participant P is in proximity to interactive installation 126$_a$.

Figure 2B:
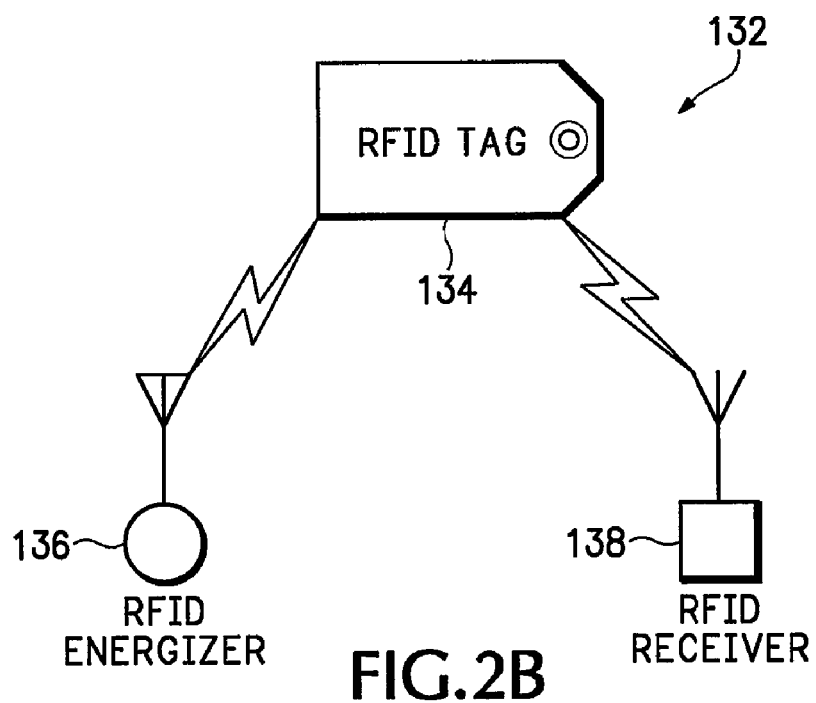
FIG. 2B is a schematic diagram illustrating an energizer/reader pair for use in semi-active detection of a radio frequency identification (RFID) device.

According to an embodiment, an RFID device 13/17 attached to and/or co-located with participant P may comprise a semi-active RFID device 134 shown in FIG. 2B, which is adapted to transmit a signal in response to first receiving an initial signal transmission from an energizer/receiver pair located with an interactive installation 126, rather than constantly transmit a signal. As illustrated in FIG. 2B according to a particular embodiment, an interactive installation 126 may comprise an energizer/receiver pair having an RFID energizer 136 and an RFID receiver 138. In one particular embodiment, energizer/receiver pair 132 may comprise one or more components and/or systems provided by Axcess Inc. Here, RFID energizer 136 may transmit an initial signal encoded with information identifying the source energizer/reader pair. Upon receiving the initial signal, RFID device 134 may transmit a signal to RFID receiver 138 encoded with the information identifying the source energizer/reader pair 132 and additional information identifying RFID device 134 (e.g., RFID code associated with participant P). Upon receipt of such a response signal from RFID device 134 at energizer/reader pair 132, location server 140 may determine that the RFID device 134 is in proximity to an interactive installation co-located with the energizer/reader pair 132, for example. Additionally, such semi-active detection of RFID device 134 may provide longer range detection than may be possible with the use of passive RFID devices while avoiding false detections with the use of active RFID devices. In alternative embodiments, however, an interactive installation may employ passive and/or fully active RFID devices for detecting the presence of an RFID device as being in proximity.

Returning to FIGS. 1A and 1B, in alternative embodiments, determining a location of a game participant and/or mobile device 12/14/16 may comprise, at an interactive installation 26, scanning a barcode label co-located with the game participant. For example, a device comprising a label with a barcode signature may be co-located with and/or fixed to a game participant and/or mobile device 12/14/16 associated with a game participant. Location server 40 may uniquely associate the barcode signature with the game participant. In one particular embodiment, when a participant arrives at an interactive installation 26, an operator (not shown) may scan a barcode label (not shown) co-located with the participant. The interactive installation 26 may then transmit information to location server 40 representing the scanned barcode signature with information identifying the particular interactive installation 26 where the label was scanned. Upon receipt of the information representing the scanned barcode signature, location server 40 may deduce that the game participant associated with the scanned barcode signature is in the vicinity of the interactive installation 26 (where the barcode label was scanned).

In another alternative embodiment, determining location of a game participant and/or mobile device 12/14/16 may comprise, at an interactive installation 26, detecting a biometric signature associated with the game participant. Such a biometric signature may comprise, for example, a retinal scan, finger print and/or palm print. Here, location server 40 may uniquely associate such a biometric signature with the game participant. Accordingly, by obtaining such a biometric signature from a game participant upon arrival at an interactive installation 26, the interactive installation 26 may transmit information representative of the scanned biometric signature to location server 40. Location server 40 may then deduce that the game participant associated with the scanned biometric signature is in the vicinity of the interactive installation 26 (where the biometric signature was detected).

In other alternative embodiments, determining location of a game participant and/or mobile device 12/14/16 may comprise, for example, using positioning system (e.g., global positioning satellite or "GPS") capabilities of a mobile device, detection of mobile device 12/14/16 communicating with an IEEE Std. 802.11 hotspot at a known location or with a an IEEE Std. 802.16 base station at a known location, for example. Here, for example, a mobile device 12/14/16 may directly communicate with a location server 40 to provide location information such as, for example, geographical coordinates or specific mobile communication access points at known locations. Such a mobile device 12/14/16 may provide periodic updates to a location server 40 in response to polling signals from the location server 40. Alternatively, a location server 40 may query the mobile device 12/14/16 for location information in response to a query from game server 38, for example.

According to an embodiment an interactive game system operator may register individual game participants by creating records associated with the game participants in a database comprising information gathered as part of a registration process. Such records may be used to collect and maintain information regarding game participants such as, for example, name, age, birth date, food allergies, handicap status (e.g., no known handicap, blind, deaf, wheelchair bound), gender, residence address and/or any other information that may be associated with individuals. This information that is gathered may be used to tailor a game experience to particular preferences or needs of a participant.

As part of a registration process, an interactive game system operator may also issue RFID devices 13/17 to the participants and include RFID codes of the issued RFID devices 13/17 in database records associated with the individual game participants. Such an issued RFID device 13/17 may comprise an RFID tag that is worn on a game participant's clothing, worn as a necklace, wristband and/or the like. Alternatively, an interactive game system operator may issue barcode labels to the participants and maintain associated barcode signatures in database records associated with the individual game participants. In another alternative, an interactive game system operator may obtain biometric samples of participants (e.g., retinal scan, finger print, palm print) and maintain associated biometric signatures in database records associated with the individual game participants. A location of a participant and/or mobile device 12 or 16 being carried by the participant may be determined based on a location of the worn RFID device 13/17. Signatures associated with participants (e.g., RFID codes, barcode signatures and biometric signatures) may then be populated to location server 40 for use in detecting the presence of a participant at an interactive installation 26.

Alternatively, a game system operator may issue barcode labels to be attached to, carried, worn or otherwise be co-located with a game participant. Here, a barcode signature of a barcode label may be associated with a particular game participant in database records. A location of the game participant may then be determined based upon the location of the barcode label (e.g., at an interactive installation 26 where such a barcode label is scanned by an operator).

As illustrated in FIGS. 1A and 1B, interactive installations 26 may communicate with game server 38, location server 40 and/or content server 46 over data links and according to one or more available communication protocols. For example, an interactive installation 26 may transmit messages to location server 40 in data packets indicating detections of RFID devices 13/17. Similarly, data packets may be used to transmit information between a game server 38 and an interactive installation 26 in connection with information received from an input device 30 or provided to an output device 28. Here, such communication may be enabled with Internet Protocol infrastructure supporting the use of UDP, TCP/IP, HTTP and/or the like. According to an embodiment, interactive installations 26 may be integrated with an interactive gaming system as "atomic" entities such that elements of an interactive installation 26 are integrated with game server 38, location server 40 and content server 46 over a single communication interface. For example, communication between an energizer/reader pair 32 and location server 40, and communication between a special effects controller 34 and game server 38 and/or content server 46 may be transmitted through a single communication adapter coupled to data communication network 36. Here, separate individual TCP/IP connections through the single communication adapter may provide communication between elements of an interactive installation 26 and game server 38 or location server 40. According to an embodiment, a game participant may be associated with a mobile device 12/14/16 which is adapted to communicate with game server 38 and/or content server 46 over, for example, a wireless communication network. Such a mobile device 12/14/16 may comprise a portable wireless communication device, such as cellular phone 12 or cellular phone 14, capable of communicating with a base station 18 and mobile switching center (MSC) 20 operated by a mobile communication service provider. Such a mobile communication service provider may comprise an entity and/or enterprise that is separate and distinct from an interactive game operator providing the interactive gaming experience. Here, for example, such a mobile communication service provider may charge a fee from a game participant using cellular phone 12 or 14 comprising, for example, a subscription fee and/or per message fee. MSC 20 may transmit data packets between mobile devices 12/14 and game server 38 and/or content server 46 over Internet 24 using a TCP/IP protocol and other higher layer protocols, for example. Alternatively, a mobile device 16 may communicate with game server 38 and/or content server 46 over a wireless local area network (WLAN) provided by one or more wireless access points 22 dispersed over an area where game participants roam at hotspots according to versions of IEEE Std. 802.11. In yet another alternative, mobile device 16 may communicate with game server 38 and/or content server 46 over a wireless metropolitan area network through base stations dispersed over a larger geographical area according to versions of IEEE Std. 802.16. According to a particular embodiment, MSC 20 may comprise any combination of equipment operated by a mobile communications service provider capable of transmitting information between Internet 24 and mobile devices 12 and/or 14 according to any one of several non-proprietary communication protocols. Such non-proprietary communication protocols may enable interoperable communication between and/or among devices which are established and operated by different entities. Accordingly, game participants may communicate with gaming infrastructure of a game operator through a mobile communication service provider (which is an entity separate from the game operator). For example, MSC 20 may comprise a short message service center (SMSC) in combination with a carrier messaging gateway to enable communication between a mobile device 12/14 and game server 38 using text messaging according to a short message service (SMS). Other such non-proprietary communication protocols may include, for example, email (including POP3 and/or SMTP), Wireless Application Protocol (WAP), Wireless Web, HTTP, TCP/IP, SIP, real-time streaming protocol (RSTP), IMAP, MMS, just to name a few. Accordingly, in alternative embodiments, MSC 20 may comprise a wireless carrier Internet gateway to enable communication between a mobile device and game server 38 using any one of several Internet supported protocols discussed herein.

Location server 40 may determine locations of game participants and/or associated mobile devices 12/14/16 as interactive game participants roam. In one embodiment, cellular phone 14 may comprise a receiver for processing signals from a satellite positioning system such as the Global Positioning System (GPS) to determine a geographical location of cellular phone 14.

Alternatively, location server 40 may associate a participant and/or mobile device 12/14/16 with a RFID code of an RFID device 13/17 (such as an RFID tag) that is to be attached to or otherwise co-located with the mobile device 12/14/16 and/or participant. According to a particular embodiment, location server 40 may determine a location of a participant and/or associated mobile device 12/14/16 as being in proximity to an interactive installation 26 when an associated RFID energizer/reader pair 32 obtains an RFID code associated with the participant. Location server 40 may determine a location of a participant and/or associated mobile device 16 based upon an identification of a particular IEEE Std. 802.11 access point or IEEE Std. 802.16 base station at a known location communicating with mobile device 16.

In yet another alternative, location server 40 may associate a participant and/or mobile device 12/14/16 with a barcode signature of a barcode label that is to be attached to or otherwise co-located with a mobile device 12/14/16 and/or participant. Here, location server 40 may determine a location of a participant and/or associated mobile device 12/14/16 as being in proximity to an interactive installation 26 when a co-located and associated barcode label is scanned at the interactive installation 26. In yet another alternative, location server 40 may associate a participant and/or mobile device 12/14/16 with one or more biometric signatures and determine a location of the participant and/or associated mobile device 12/14/16 as being in proximity to an interactive installation 26 when at least one of the biometric signatures is detected at the interactive installation 26.

In addition to communicating with game server 38 over Internet 24, a mobile device 12/14/16 may comprise one or more output devices such as, for example, a speaker for providing an audio output and a high resolution display capable of displaying text, video images and/or still images. Here, such output devices may be used for presenting information rendered from media content received from game server 38 and/or content server 46, for example. According to an embodiment, media content may be encoded in a particular format that enables one or more mobile devices 12/14/16 to render a presentation based, at least in part, on information encoded in such media content. Such devices may be implemented in hardware, software, or combinations of hardware and software. Such a presentation may comprise, for example, images, text, sounds, other perceivable environmental phenomena and/or combinations thereof. In some embodiments, media content comprises information that may be used to render a presentation that is to be passively experienced by a viewer or listener. Alternatively, media content may comprise interactive media content which is responsive to inputs and/or stimuli from a user. Such interactive media content may be implemented in an interactive game to provide users with an interactive game experience, for example.

A mobile device 12/14/16 may also comprise one or more input devices such as, for example, a microphone, camera, keyboard, keypad, thumbwheel, button or touchpad, just to name a few. Here, such input devices may receive information for transmission from a participant to other elements of gaming system 10 such as, for example, game server 38. Here, such an input device in combination with one or more of the aforementioned output devices of a mobile device 12/14/16 may provide a graphical user interface (GUI) for receiving information. Also, such a mobile device 12/14/16 may comprise a computing platform for hosting software applications and/or processes capable of communicating with game server 38 and/or content server 46.

Figure 3A:
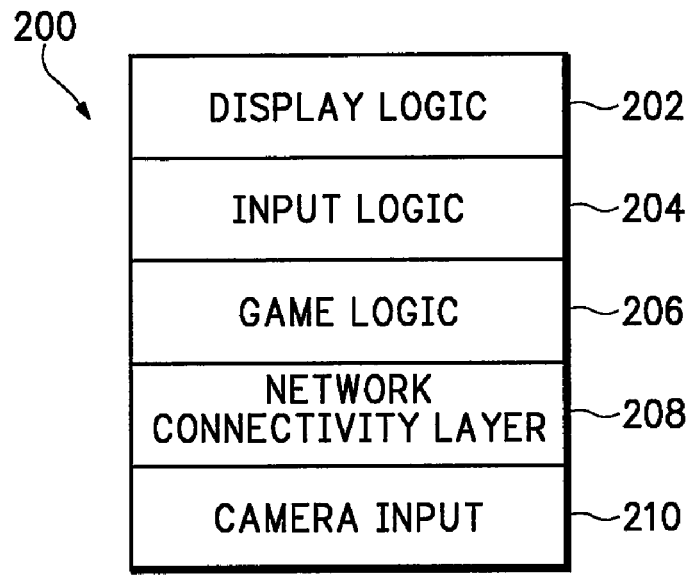
FIG. 3A is a schematic diagram illustrating an architecture of software hosted on a computing platform of a mobile device for communicating with a game server according to an embodiment.

FIG. 3A is a schematic diagram illustrating an architecture 200 of software hosted on a computing platform of a mobile device (e.g., mobile device 12, 14 or 16 as shown in FIGS. 1A and 1B) for communicating with game server 38 according to an embodiment. Display logic 202, input logic 204, network connectivity layer 208 and camera input 210 may comprise standard software and/or firmware that is provided with a mobile device or handset installed by a manufacturer or mobile communication service provider, for example. Game logic 206 may comprise an agent application that is launched to the mobile device 12/14/16 specifically for the purpose of interacting with game server 38 to enable providing an interactive gaming experience to a game participant. In one embodiment, game logic 206 may be downloaded from game server 38 by selection of a universal resource locator (URL) as part of a process to register a participant for an interactive game. Alternatively, game logic 206 may be installed from an insertable media device, such as a flash card, or through a connection to a personal computer such as a USB, Firewire or Bluetooth connection. In alternative embodiments, architecture 200 may comprise a manufacturer's software build without an agent or other application provided by an interactive game operator.

Figure 3B:
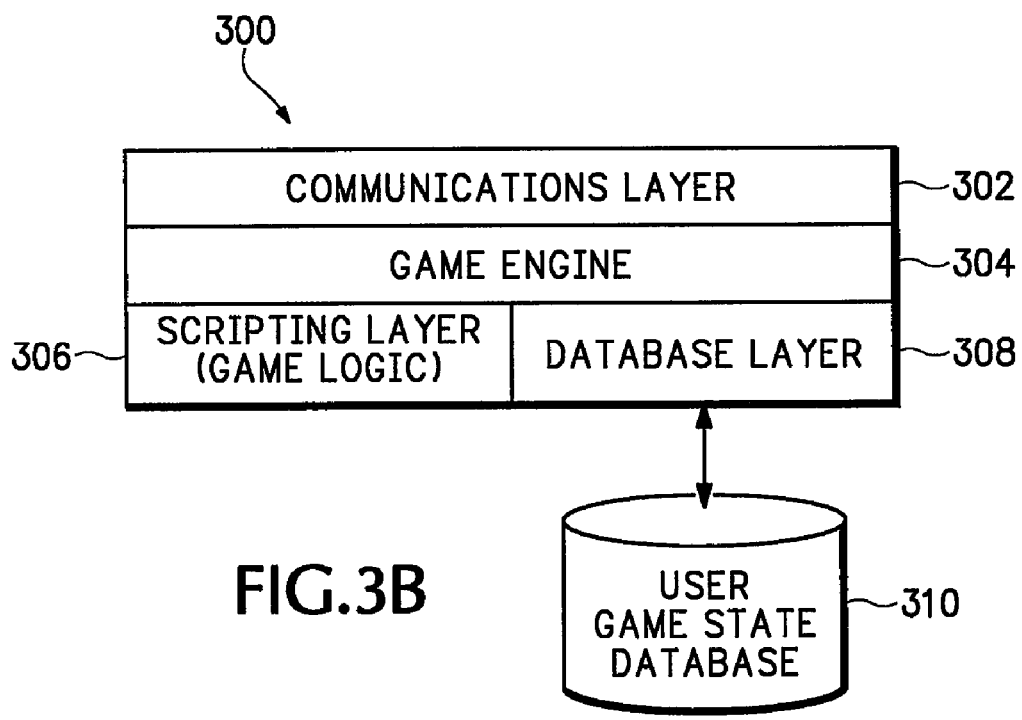
FIG. 3B is a schematic diagram illustrating an architecture of software hosted on a game server for communicating with elements of an interactive gaming system according to an embodiment.

FIG. 3B is a schematic diagram illustrating an architecture 300 of software hosted on game server 38 for communicating with elements of an interactive gaming system according to an embodiment. While illustrated as a single computing platform for the purpose of convenient illustration, it should be understood that game server 38 may comprise multiple computing platforms integrated to provide functionality described herein. Communications layer 302 may provide logic for communicating with mobile devices 12/14/16, location server 40 and/or interactive installations 26 over a data communication network comprising, for example, Internet Protocol infrastructure. Here, for example, communications layer may support UDP, TCP/IP, HTTP and/or higher layer protocols. While interactive installations 26 may provide infrastructure that may be adapted to different gaming experiences, scripting layer 306 may comprise context-specific rules and/or logic governing game states, outcomes and processes to provide a context-specific gaming experience to participants. According to an embodiment, game engine 304 may comprise "middleware" for integrating scripting layer 306 with other applications hosted on an interactive installations 26, location server 40 and/or mobile devices 12/14/16. Here, for example, game engine 304 may comprise an application programming interface (API) to which scripting layer 306 may invoke "calls" for communicating with location server 40, interactive installations 26 and/or mobile devices 12/14/16 by specifying an appropriate handle and arguments. Such calls may be directed to, for example, a query to location server 40 as to whether a specific game participant is located at an interactive installation 26, a request to location server 40 to provide an alert when a specific game participant arrives at an interactive installation or a list of game participants presently located at an interactive installation 26.

While scripting layer 306 may comprise context-specific game logic, game engine 304 may be agnostic to any particular such context-specific game logic. Accordingly, interactive installations 26, location server 40 and other gaming infrastructure may be preserved while a different or updated scripting layer 306 is integrated with game engine 304 to give game participants a new and/or updated interactive gaming experience. Likewise, by providing an interface to atomic interactive installations 26, interactive installations 26 may be added to or removed from interactive gaming system 10 without modifying the scripting layer 306.

According to an embodiment, game engine 304 comprises middleware that may be readily transported to computing platforms at different game-play sites without substantial modification. Here, scripting layer 306 may be tailored to features of interactive installations at a different site and/or specific game features to be provided. Also, game engine 304 may integrate context-specific game logic of multiple interactive games on a single computing platform for providing multiple interactive games over a single site.

Game engine 304 may also communicate with a user game state database 310 through a database layer 308 storing information such as, for example, information associated with game participants such as personal profiles, participant specific information such as personal preferences, age, birth date, gender, residence and/or handicap status, information identifying a mobile device and game state. Here, scripting layer 306 may access information in database 310 by invoking calls to game engine 304. Such calls may comprise, for example, queries for specific information in database 310 retrievable through game engine 304 and database layer 308.

Figure 4:
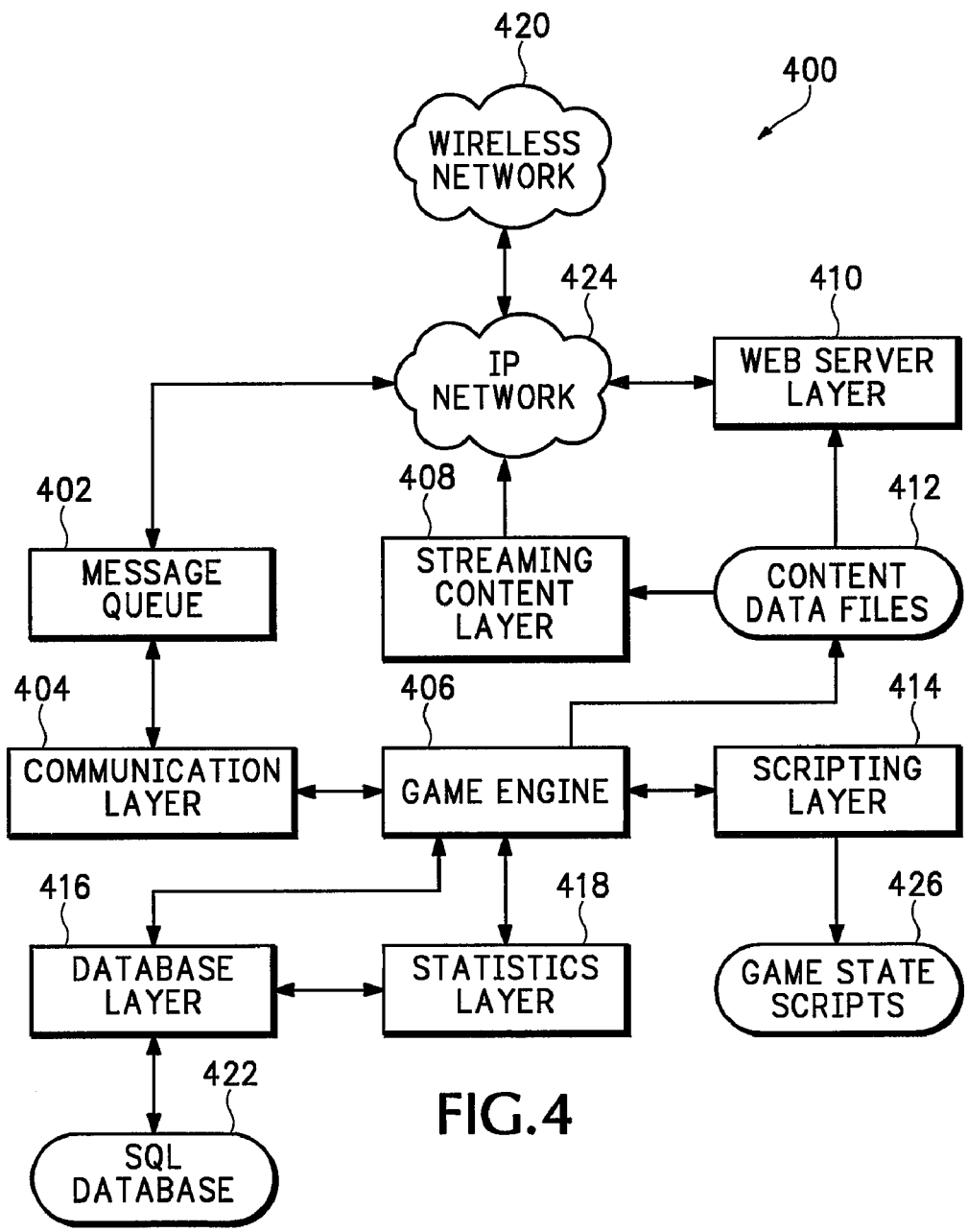
FIG. 4 is a schematic diagram illustrating interactions among software components relating to a game server according to an embodiment.

FIG. 4 is a schematic diagram illustrating interactions of software components relating to a game server such as game server 38 according to an embodiment of a network 400. Game engine 406 may communicate with applications hosted on one or more mobile devices (such as mobile devices 12/14/16 shown in FIGS. 1A and 1B) through network 424 and/or wireless network 420. In the particularly illustrated embodiment, network 424 may comprise Internet Protocol infrastructure capable of transmitting information between devices according to the Internet Protocol. As such, game engine 406 may communicate with processes hosted on location server (e.g., location server 40 in FIGS. 1A and 1B) and/or interactive installations (e.g., an interactive installation 26 in FIG. 1A) through network 424. Additionally, streaming content layer 408 may be adapted to provide media content to a mobile device 12/14/16 and/or interactive installation 26 from content data files 412. A statistics layer 418 may collect information regarding events of interest to be maintained in database 422 for later evaluation and analysis. A database layer 416 may be adapted to control access by game engine 406 and/or statistics layer 418 to database 422.

According to an embodiment communication layer 404 may facilitate routing of messages between scripts at scripting layer 414 (and through game engine 406) and a mobile device 12/14/16, location server 40 and/or interactive installations 26. Here, for example, communication layer 404 may establish and terminate connections such as TCP/IP connections used for transmitting information between a mobile device 12/14/16 associated with game participants and context-specific game logic of scripting layer 414. Scripting layer 414 may access game state scripts 426 which may comprise information describing specific actions to be taken for particular game participant game states, for example.

According to an embodiment, game engine 406 and/or communication layer 404 may queue messages for transmission to mobile devices 12/14/16 in response to calls from scripting layer 414 in message queue 402. Messages in a queue for transmission to a mobile device 12/14/16 or interactive installation 26 may be maintained in an order that is to be processed by game logic hosted on the mobile device 12/14/16 as part of an interactive gaming experience and/or consistent with proper transition in game state. In one particular embodiment, following transmission of a message to a mobile device 12/14/16 from message queue 402, communication layer 404 and/or game engine 406 may require an indication of receipt of the transmitted message at the intended recipient device before transmitting a subsequent message to the intended recipient device. For example, communication layer 404 and/or game engine 406 may transmit such a subsequent message from message queue 402 upon receipt of an acknowledgement message from the intended recipient device.

Also, mobile devices 12/14/16 and interactive installations 26 may similarly queue messages for transmission to game engine 406 through IP network 424. Here, such messages may be maintained in an order that is to be processed by particular scripts in scripting layer 414. Again, a subsequent message in message queue 402 may be transmitted upon a determination that a previous message had been received at game engine 406.

According to an embodiment, mobile devices 12/14/16 communicating with game engine 406 may transmit periodic "heartbeat" messages to communication layer 404 for maintaining connections with game engine 406 and/or scripting layer 414. Following establishing one or more connections between a mobile device 12/14/16 and game engine 406 and/or scripting layer 414, communication layer 404 may terminate or sever one or more of the established connections in response to an absence of receipt of a heartbeat message from the mobile device 12/14/16 over a predetermined time period. In an alternative embodiment, communication layer 404 may transmit periodic heartbeat messages to mobile devices 12/14/16 having connections with game engine 406 and/or scripting layer 414. Here, a mobile device 12/14/16 may terminate or sever one or more of its connections to game engine 406 and/or scripting layer 414 in response to an absence of receipt of a heartbeat message from communication layer 404 over a particular time period.

According to an embodiment game engine 406 may communicate with a location server (e.g., location server 40 shown in FIG. 1) for determining locations of mobile devices 12/14/16. In one particular embodiment, scripting layer 414 may call game engine 406 for an alert upon detection of a mobile device 12/14/16 being in proximity to an interactive installation 26. Such a call may be invoked, for example, in response to detection of a particular gaming state of a participant associated with the mobile device 12/14/16. In response to such a call from scripting layer 414, for example, game engine 406 may transmit a message to the location server 40 requesting that the location server 40 provide an alert upon detection of a mobile device 12/14/16 being in proximity to a particular interactive installation 26. Such a message may specify, for example, information identifying particular mobile devices 12/14/16 and/or game participants of interest and particular interactive installations. Such information identifying a particular mobile device 12/14/16 and/or game participants may comprise information representative signatures such as, for example, associated RFID codes, barcode signatures or biometric signatures. Upon detecting that a particular mobile device 12/14/16 and/or game participant in proximity to a particular interactive installation of interest, the location server 40 may transmit a message back to game engine 406 to report this event. In an alternative embodiment, location server 40 may automatically update game engine 406 and/or scripting layer 414 on changes in location of mobile devices and/or associated game participants.

Returning to FIG. 3A, game logic 206 hosted on a mobile device 12/14/16 may comprise a custom application compiled from source code developed in any one of several programming environments such as, for example, Java, j2me, BREW, Windows CE API, C, C++, Adobe Flash, Adobe Flash Lite and/or the like. In one particular embodiment location server 40 and/or game server may pair a mobile device 12/14/16 executing this application with a unique signature such as a biometric signature, barcode signature of a barcode label or a unique RFID code of an RFID device 13/17 to be co-located with the mobile device 12/14/16 and/or game participant carrying the mobile device 12/14/16. Accordingly, a location of a game participant may be determined as the location of an RFID device 13/17 or barcode label being carried and/or worn by the game participant. Likewise, a location of mobile device 12/14/16 carried by a game participant may be determined as the location of an RFID device 13/17 or barcode label being carried and/or worn by the game participant.

Figure 5:
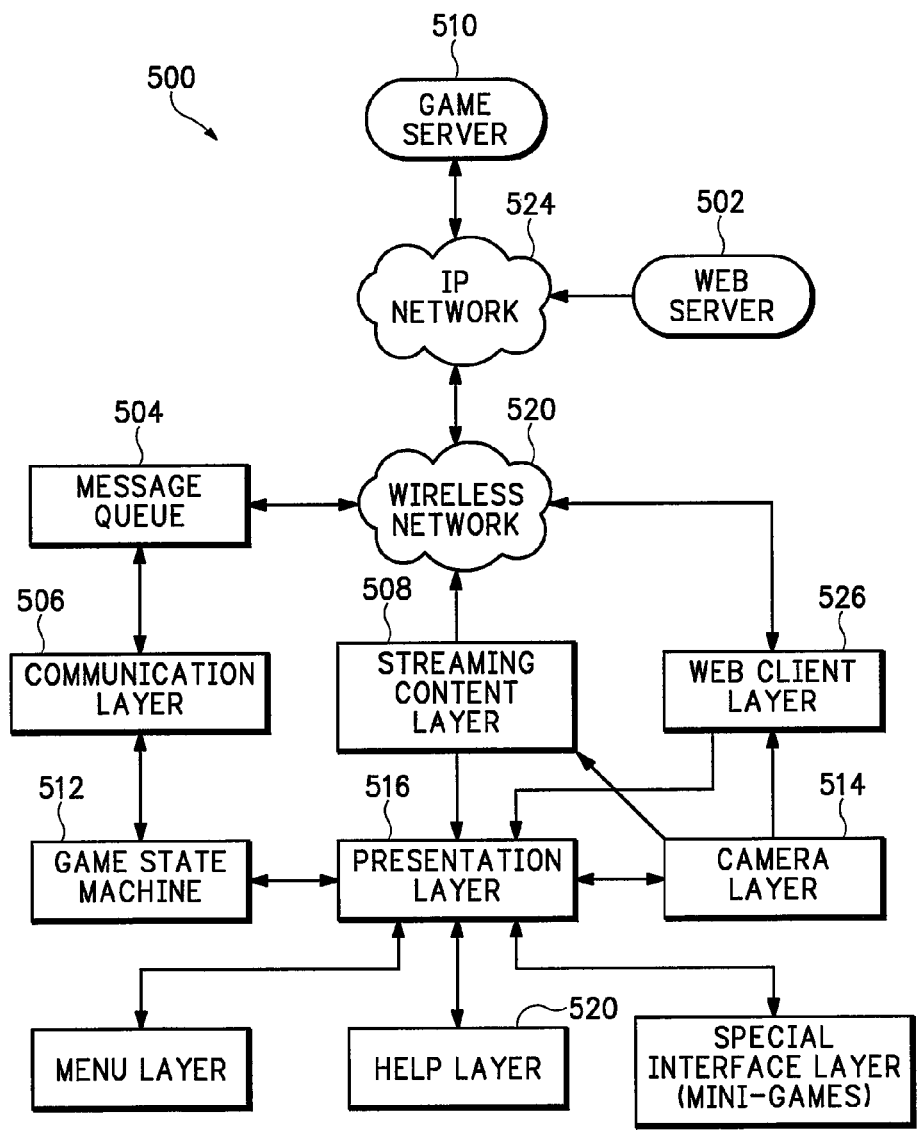
FIG. 5 is a schematic diagram illustrating interactions among software components relating to a mobile device to provide a gaming experience to a game participant according to an embodiment.

FIG. 5 is a schematic diagram illustrating interactions of software components relating to a mobile device 12/14/16 to provide a gaming experience to a game participant over a network 500 according to an embodiment. Hence, applications hosted on a mobile device 12/14/16 may communicate with game server 510 through communication layer 506, streaming content layer 508 and/or web client layer 526. As illustrated in FIG. 5 in a particular embodiment, communication layer 506, streaming content layer 508 and/or web client layer 526 may communicate with game server 510 through wireless network 520 and network 524 using any one of several wirelessly enabled connections such as, for example, a direct TCP/IP connection between game server 510 and mobile device applications, common gateway interface (CGI), servlet connection, SMS push registry, HTTP polling of a file associated with participant game state, e-mail connection, MMS and WAP push, just to name a few. Messages from communication layer 506 to game server 510 may be enqueued in message queue 504 using techniques discussed above.

A game state machine 512 hosted on a mobile device 12/14/16 may communicate with game server 510 over wireless network 520 and network 524 through a communication layer 506. Game state machine 512 may maintain a current game state associated with a game participant and inform the game participant as to a next task, mission and/or objective that is required to advance to a subsequent game state. In one particular example for the purpose of illustration, game state machine 512 may inform a game participant of a need to find and climb a particular structure (e.g., a statue) in a garden. Upon reaching and/or climbing the structure, game server 510 may transmit a message to state machine 512 to advance the participant to a subsequent game state. Game state machine 512 may then communicate with presentation layer 516 to inform the participant of completion of the present task, mission and/or objective and inform the participant of a subsequent task, mission and/or objective.

Here, accordingly, game server 510 may transmit a message to game state machine 512 hosted on a mobile device 12/14/16 to advance a game state of a participant based, at least in part, on a location of the mobile device 12/14/16 and/or participant. According to a particular embodiment, location server 40 may determine locations of mobile devices 12/14/16 and/or game participants as being in proximity to an interactive installation 26. In one embodiment, with knowledge of a participant's current game state, game server 510 may request that location server 40 provide an alert message to inform game server 510 when the participant approaches an interactive installation 26 (e.g., detecting an RFID code from an RFID device 13/17 associated with the participant and/or mobile device 12/14/16). Here, game server 510 may determine that such an interactive installation 26 is relevant to the participant's current game state. Alternatively, game server 510 may repeatedly poll the location server 40 to determine whether the participant has arrived at a particular location. In another embodiment, game state machine 512 may coordinate with location server 40 to affect objects located at an interactive installation 26. Initially, game server 510 may determine that a participant and/or mobile device 12/14/16 associated with game state machine 512 has a game state and/or location that is appropriate for affecting such objects at an interactive installation 26. Upon such a determination, in a particular example, game server 510 may transmit a message to presentation layer 516 to display a prompt instructing the participant to unlock a door by making a selection at a user interface of a mobile device 12/14/16 (e.g., press a key or make a selection from a GUI). Such a selection may initiate transmission of a message to game server 510, which in turn may transmit a message to an interactive installation 26 to unlock the door.

An intention of a current game may be to only allow registered game participants to pass through the door. If the participant makes the selection at the mobile device 12/14/16 to unlock the door prior to being at or in front of the door, game server 510 may prevent the door from unlocking, thereby preventing a non-participant from entering through the door. In one particular embodiment, in response to a selection at a mobile device 12/14/16 to unlock the door, game state machine 512 may transmit a message to game server 510 including information identifying the mobile device 12/14/16 and/or associated participant (e.g., RFID code associated with mobile device 12/16 and/or associated participant). Upon receiving such a message, game server 510 may query a location server 40 to confirm the location of the game participant. In one particular example, game server 510 may request and/or query from location server 40 for a list of RFID codes received from RFID devices by an RFID reader installed at the door. Game server 510 may then selectively transmit a message to the interactive installation 26 to unlock the door in response to confirming with location server 40 that the participant is at or in front of the door.

According to an embodiment game server 510 may employ any one of several techniques for associating a game participant and/or mobile device with a game state. For example, such a game state may be determined from information in a database regarding past game states, inputs and/or messages received from the participant and/or mobile device 12/14/16, associated interactions with interactive installations 26, and/or the like. Alternatively, game server 510 may receive messages from game state machine 512 hosted on a mobile device 12/14/16, updating game server 510 as to a current associated game state. According to an embodiment, a mobile device 12/14/16 may be capable of rendering media content for presentation to a game participant through one or more output devices of the mobile device 12/14/16. Such media content may comprise, for example, video, audio, text, or still image formats and/or the like. Such media content may be delivered to the mobile device using any one of several techniques such as, for example, streaming, loading the media content as part of an application that is launched to the mobile device and/or transmitting the media content (e.g., wirelessly) for storage on a storage medium on the mobile device 12/14/16 for retrieval by an application. Also, game server 510 may transmit media content for presentation on a mobile device 12/14/16, which is then presented to the game participant in an intended format.

In one particular embodiment a mobile device may receive media content for presentation from a Universal Resource Identifier (URI). Here, for example, game server 510 may transmit a message to game state machine 512 including a URI for presentation to a participant through presentation layer 516. Upon selecting the URI (e.g., as a web link presented on a display) to obtain media content through either streaming content layer 508 and/or web client layer 526. Here, such media content may be delivered to presentation layer 516 (e.g., from web server 502) using any one of several suitable wirelessly enabled communication protocols such as, for example, HTTP, TCP/IP, SIP, WAP, real-time streaming protocol (RTSP), SMS, IMAP, POP3, SMTP, MMS, to name a few. According to an embodiment game server 510 may provide media content for rendering presentation to a game participant through presentation layer 516 based, at least in part, on a location of the participant and/or an associated game state. Here, game server 510 may select media content to be delivered and/or rendered for presentation to a participant based, at least in part, on a game state associated with a mobile device 12/14/16 and/or location of the participant. Additionally, camera layer 514 may be adapted to format and/or encode image data captured at a camera device (not shown) for transmission to web server 502 or other devices through streaming content layer 508 and/or web client layer 526.

Upon selection of such media content, in one particular embodiment, game server 510 may formulate and transmit a URI to a mobile device 12/14/16. Accordingly, game server 510 may tailor particular media content that is to be provided to presentation layer 516 by appropriately determining and/or formulating a URI that is to be transmitted to an associated mobile device 12/14/16. Such a URI may comprise a link addressed to specific media content selected for presentation to a game participant at a mobile device 12/14/16 based, at least in part, on a game state and/or location. Such a URI may be addressed, for example, to a process hosted on web server 502. Upon selection of the URI at the mobile device 12/14/16, for example, media content such as audio and/or video content may be streamed to presentation layer 516 through streaming content layer 508. Alternatively, non-streamed audio, video, text and/or still imagery media content may be provided to presentation layer 516 through web client layer 526. According to an embodiment, a participant may communicate with game server 510 using text messaging according to the aforementioned SMS protocol. For example, an interactive game operator may issue an RFID device 13/17, such as an RFID tag to a participant (e.g., to be worn by the participant) that is to use a mobile phone with text messaging capabilities. The game operator may then associate the telephone number of the mobile phone with an RFID code associated with the issued RFID in a database accessible by game server 510. Such a telephone number may be populated to a location server 40 in association with the RFID code, for example. Game server 510 and/or a location server 40 detecting a presence of the RFID code at an RFID reader located at an interactive installation 26 can determine that the mobile phone is in proximity to the interactive installation 26. Game server 510 may then transmit text messages to the participant based, at least in part, on the location of the participant and/or a game state associated with the mobile phone.

According to an embodiment, associating a telephone number of a text messaging enabled mobile phone 12 with an RFID code in a database may establish an initial game state for the mobile phone 12. In this initial game state, for example, a context-specific game script hosted on game server 510 may transmit an initial instruction to a participant as a text message. Referring to the previous example of enabling the unlocking of a door, such a text message may instruct the participant to go to a locked door at a given location and reply to the message with a text message comprising the word "unlock." Here, such a text message to the mobile phone 12 from server 510 may be transmitted through a carrier network operated by a mobile communication service provider, for example, through a message aggregator or exposed messaging APIs directly into the service provider's messaging system. The participant may respond to the message, with a text message comprising the word "unlock," which may be sent to game server 510 along with the telephone number of the mobile telephone 12 through an appropriate messaging API such as a Short Message Peer-to-Peer (SMPP) Message service, for example. In a particular embodiment, such an SMPP message service may be provided, at least in part, by SMPP server 48.

Continuing with the currently illustrated example, a context-specific game script hosted on game server 510 may associate a phone number with the text message containing the word "unlock" and determine a game state associated with the mobile phone 12. The context-specific game script may then call an associated game engine to obtain RFID codes (e.g., obtained from a location server 40) associated with mobile devices and/or participants located at the locked door in question. If the RFID code associated with the mobile phone 12 is among the RFID codes received associated with mobile devices and/or participants located at the locked door in question, the context-specific game script may call the game engine to initiate transmission of a message to the associated interactive installation to unlock the door. Otherwise, the context-specific game script may call the game engine to transmit an appropriate text message to the phone number of the mobile phone 12. Accordingly, a message "unlock" on a mobile device 12/14/16 provides a presentation of media content at the mobile device 12/14/16 while a special effect external to the mobile device (unlocking the door) is initiated based, at least in part, on a location of the mobile device and/or an associated game state.

According to a particular embodiment, a mobile communication service provider may transmit text messages between game server 510 and text messaging enabled mobile phones. Such a mobile communication service provider may charge a fee to game participants for the service of forwarding such text messages between a mobile device 12/14 and game server 510. According to an embodiment, an interactive game operator may establish an arrangement with one or more such mobile communication service providers for payment to the interactive game operator for processing text messages at game server 510. Here, for example, an interactive game operator may receive a flat fee or a per message fee for text messages transmitted from or received at game server 510 through the mobile communication service provider.

In an alternative embodiment, media content may be pre-stored on a memory device of a mobile device 12/14/16. Such pre-stored media content may comprise, for example, encoded audio and/or video signals. Upon detection of one or more particular conditions, game server 510 may transmit a message to the mobile device to initiate presentation of the media content on the mobile device. Such conditions may comprise, for example, detection of the mobile device 12/14/16 at a particular location (e.g., interactive station) and/or game state associated with the mobile device 12/14/16. In addition to transmitting a message to initiate presentation of the media content, game server 510 may also initiate a presentation of a special effect external to the mobile device 12/14/16 (e.g., a special effect generated by an interactive installation 26 in proximity to the detected location of the mobile device).

A mobile device 12/14/16 hosting game state machine 512 may communicate with game server 510 using a Multimedia Messaging Service (MMS), Wireless Application Protocol (WAP) and/or Wireless Web protocol to provide a visually rich interactive experience. Here, instead of using SMS or direct IP protocols, game server 510 may transmit MMS, WAP and/or Wireless Web messages to a mobile device 12/14/16 through a Multimedia Messaging Service Center (MMSC) of a mobile communication service provider. Such message may include, for example, text, URIs, forms and media content (e.g., still images, audio, video, XHTML Mobile Profile (MP) games). Connectivity between a server 510 and a mobile device 12/14/16 using MMS, WAP and/or Wireless Web may be established using any one of several techniques.

According to an embodiment, server 510 may establish connectivity with a mobile device 12/14/16 by transmitting a URI or list of URIs in an MMS or SMS message to the mobile device 12/14/16. From the mobile device 12/14/16, a participant may select one or more of these URIs either directly or by selecting one or more XHTML-MP objects associated with the URIs, for example. Here, such a selection of a URI may launch a web or WAP browser on the mobile device 12/14/16, and present one or more websites providing one or more interactive interfaces associated with a game state. From these websites, a participant may interact with game server 510 by transmitting messages via HTTP and/or WAP protocols, for example, by calling CGI scripts linked to a connectivity layer of game server 510. The game server 510 may then respond back to the mobile device 12/14/16 using SMS, MMS, WAP and/or Wireless Web messages.

In an alternative embodiment, server 510 may establish connectivity with a mobile device by providing a web form in a body of an MMS, WAP and/or Wireless Web message transmitted to the mobile device 12/14/16. In responding to the message by submitting the form with requested information, the mobile device 12/14/16 may call a CGI script at web server 502 to pass the requested information to game server 510. Game server 510 may then process the requested information, and initialize and/or update an associated participant's game state. Game server 510 may then respond to the mobile device 12/14/16 with a subsequent MMS, WAP and/or Wireless Web message.

In another alternative embodiment, game server 510 may establish connectivity with a mobile device 12/14/16 by providing one or more WAP and/or HTML pages to a mobile device 12/14/16 according to a WAP-push protocol, or in response to polling from a browser hosted on the mobile device 12/14/16. The one or more WAP and/or HTML pages may provide links, and forms permitting a game participant to transmit messages to and receive messages from server 510 via a CGI, for example.

A game participant and/or associated mobile device 12/14/16 may transition through a progression of game states while interactively engaging with an interactive gaming system. In a particular embodiment, game states may be associated with tasks, puzzles and/or missions that a participant may complete, solve and/or accomplish, etc. For example, a participant at a particular game state may complete, solve and/or accomplish an associated task, objectives, puzzle and/or mission as a prerequisite for transitioning to a subsequent game state. According to an embodiment, a game participant may access "help" information for obtaining a hint and/or clue with the purpose of assisting the game participant in doing what is need to transition to the next game state, for example. For example, help layer 520 may receive a selection from a participant at a user interface of a mobile device 12/14/16 to receive such a hint and/or clue. Such a selection may be made, for example, by depressing a key on a keyboard or keypad and/or making a selection from a GUI to initiate a message to game server 510 requesting help. Game server 510 may have knowledge of a game state of a participant and/or associated mobile device 12/14/16. With knowledge of the particular game state and/or location of the participant, game server 510 may respond with a message to presentation layer 516 for the presentation of a hint and/or clue to the participant through the mobile device 12/14/16 in a visual and/or audio format. Here, a hint or clue may be tailored to a specific location of the game participant and/or associated mobile device 12/14/16. In a particular example, such a location-based clue message may refer to an object and/or landmark visible at an interactive installation 26 such as a flag with a certain number of objects. Such a location-based clue message may direct the game participant to count the object on the flag to answer a question and progress to a subsequent game state.

According to an embodiment, game server 510 may store multiple hints and/or clues for a particular game state differing in explicitness. In addition, to be based on game state, such multiple hints and/or clues may be based, at least in part, on locations of the recipient game participants. A participant may request multiple hints and/or clues for assistance in attempting to progress to a subsequent game state. Here, in response to successive selections for assistance through help layer 520, while in a particular game state, game server 510 may provide increasingly explicit hints and/or clues. For example, after selecting help for a first clue and then struggling to transition to the next game state, a participant may select help for a second, more explicit, clue. Eventually, the participant may select help to receive a final clue telling the participant exactly how to transition to the subsequent game state.

According to an embodiment, a game participant may attempt to solve multiple puzzles and/or problems simultaneously. Here, for example, presentation layer 516 may display information on a screen relating to a currently selected one of multiple puzzles for which a participant is currently providing inputs to solve. Here, help layer 520 may interpret a selection for help in a context sensitive manner and request help from game server 510 for the puzzle currently selected for display on the screen.

According to an embodiment game server 510 may keep track of how long a participant and/or associated mobile device 12/14/16 is in any one game state. Here, if game server 510 determines that a participant has been in a game state for an extended period of time, game server 510 may transmit a message to the mobile device 12/14/16 for presentation of an audio and/or visual invitation for a hint and/or clue, which may assist the participant in advancing to the next game state. Additionally, such a hint and/or clue may be based, at least in part, on a location of the participant and/or associated mobile device 12/14/16. By making an appropriate selection through help layer 520, the participant may choose to accept the clue or deny the clue. In response to the participant selecting to accept the clue, help layer 520 may respond with a message to game server 510, which in turn provides a subsequent message to the mobile device 12/14/16 for presentation of the hint and/or clue. Here, for example, an invitation to a clue and/or hint may comprise a URI which is selectable to obtain media content from web server 502 such as a flash file through web client layer 526 or streamed for media content through streaming content layer 508. Alternatively, an initial message from game server 510 inviting the participant to receive a clue (e.g., after being in a particular game state for a duration) may be transmitted with an applet. Here, the participant's selection to accept the clue may launch the applet to the mobile device 12/14/16 to present the participant with the audio and/or visual clue. Selecting to refuse the clue may merely delete the applet from the mobile device 12/14/16.

According to an embodiment, a participant through help layer 520 may request game server 510 for help from another participant. Here, the requesting participant may specify a specific participant from whom the requesting participant desires assistance. In the absence of specifying such a participant, context-specific script logic hosted on game server 510 may select one or more other participants to provide assistance. Communication between an assisting participant and assisted participant may be provided using any one of several methods. For example, mobile devices 12/14/16 of respective assisting and assisted participants may be provided with a communication channel comprising direct text messaging, voice and/or video transmission capabilities. Alternatively, the assisting participant may perceive the particular problem facing the participant needing assistance, and forward a suggestion to the mobile device 12/14/16 of the participant needing assistance. Such a suggestion may be presented on the mobile device of the participant needing assistance as a text, still image, audio and/or video message, for example.

According to an embodiment a mobile device 12/14/16 may host an application to emulate adjustments being made to a camera such as, for example, pan, tilt and zoom adjustments in response to inputs being made to a user interface of the mobile device 12/14/16. In response to such adjustments, an associated virtual camera image displayed on the mobile device 12/14/16 may be manipulated in kind according to the emulated adjustments. Such an application may be implemented in any one of a plurality of environments such as, for example, XHTML, WAP, or a custom application interface written in a suitable programming languages such as, for example, Java, J2ME, C, C#, C++, Net technology, Windows CE, to name a few. Here, using techniques known to those of ordinary skill in the art, web server 502 may periodically poll image data (e.g., once per second or ten times per second) from one or more Internet Protocol cameras (not shown) positioned to capture an image from a scene in real-time. Web server 502 may partition an image from the IP cameras into a matrix of tiles which are selected and/or configured to provide a virtual camera image to a mobile device 12/14/16 in response to the emulated adjustments using techniques known to those of ordinary skill in the art. Accordingly, web server 502 may provide an encoded image emulating responses to adjustments to the virtual camera when displayed on the mobile device 12/14/16.

In addition to being affected by emulated camera adjustments, such a virtual camera image may be based, at least in part, upon a location associated with the mobile device 12/14/16 receiving the virtual camera image. Here, for example, a virtual camera image provided to a mobile device 12/14/16 may comprise a particular view of an object that is consistent with how the object is positioned and/or oriented relative to the mobile device 12/14/16. In a particular embodiment such a virtual camera image may change as the mobile device 12/14/16 changes location in a game-play area.

Figure 6:
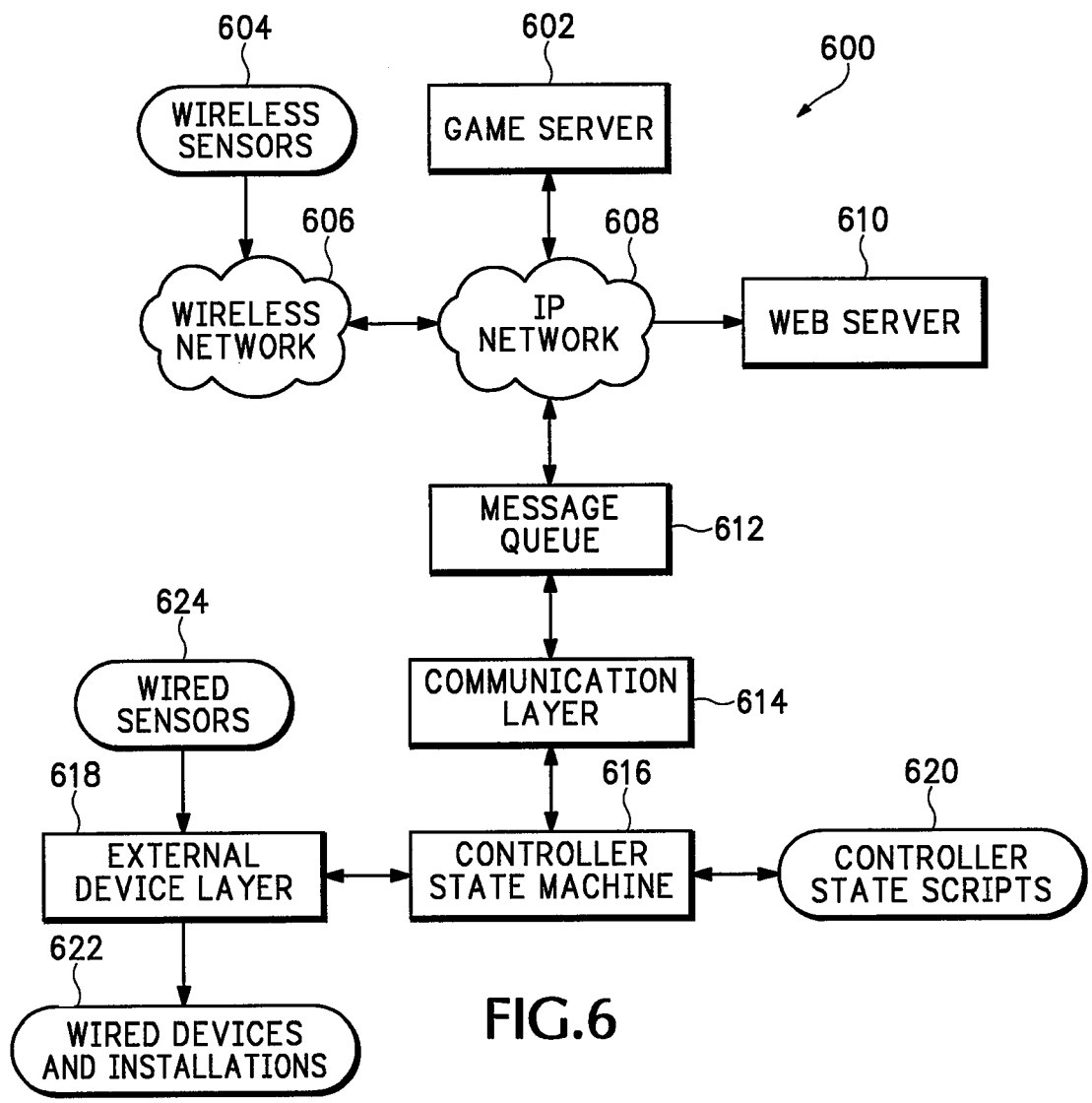
FIG. 6 is a schematic diagram illustrating interactions among software components relating to an interactive installation according to an embodiment.

FIG. 6 is a schematic diagram illustrating interactions of software components relating to an interactive installation 26 to provide a gaming experience to game participants over a network 600 according to an embodiment. Here, a controller state machine 616 may be adapted to communicate with a game server 602 and/or web server 610 through communication layer and message queue 612. Message queue 612 may be adapted to enqueue messages addressed to either game server 602 or web server 610 using techniques illustrated above.

Controller state machine 616 may be implemented in a special effects controller 34, included as part of an interactive installation 26, to communicate with game server 602, and interact with wired sensors 624 and wireless sensors 604, and other wired devices 622 connected to the special effects controller through external device layer 618. Controller state machine 616 may be adapted to operate according to locally stored controller state scripts based, for example, on particular conditions and/or states of such an interactive installation 26. Also, such an interactive installation 26 may also be co-located with one or more sensors capable of detecting signatures associated with a game participant such as, for example, a barcode scanner, biometric sensor and/or RFID energizer/reader pairs (e.g., RFID energizer/reader pair 32 shown in FIG. 1 or RFID energizer/reader pair 136/138 shown in FIG. 2B) connected to a location server 40 via network 608.

Accordingly, using such sensors to detect signatures associated with a game participant may be used to detect a game participant's arrival or presence in an area about the interactive installation 26. In one particular embodiment, such information detecting presence of a game participant may comprise information representing a signature associated with the game participant, for example, which may be transmitted to game server 602. Here, game server 602 may associate such information with an identity of the associated game participant, and forward metadata to controller state machine 616 which includes information unique to the participant (e.g., associated with the game participant's identity in a database). Controller state machine 616 may then initiate generation of a special effect at the interactive installation 26 based, at least in part, on the information unique to the participant. Such information unique to the participant may be representative of the participant's age, gender, birth date or personal preferences, just to name a few examples.

Sensors 604 and 624 may comprise any one of several devices capable of receiving physical inputs from a game participant such as, for example, push buttons, pressure sensors, cameras, light sensors, vibration sensors, just to name a few. Wired sensors 624 may be physically connected to a computing platform (not shown) hosting controller state machine 616 using any one of several interfaces such as, for example, USB, Firewire or Ethernet, just to name a few. In the presently illustrated embodiment, wireless sensors 604 communicate with controller state machine 616 through wireless network 606, network 608 and communication layer 614. In alternative embodiments, sensors may communicate directly with external device layer 618 using a wireless connection such as Bluetooth or IEEE Std. 802.11.

According to an embodiment, game server 602 may affect a game state of a mobile device 12/14/16 in response to events at an interactive installation 26 detected by controller state machine 616. In a particular example provided for the purpose of illustration, an interactive installation 26 may be positioned in a corner of a dark room. Also, game server 602 may request that a location server 40 provide an alert when a participant approaches the interactive installation 26. As a game participant approaches the interactive installation 26, while carrying a mobile device 12/14/16 and associated RFID device 13/17 for example, an RFID reader may obtain an RFID code associated with the mobile device 12/14/16 and/or participant, and forward an alert comprising the RFID code to the location server 40. Upon receipt of the RFID code, context-specific script logic hosted on game server 602 may determine that a light at the interactive installation 26 should be turned on, and initiate transmission of a message to controller state machine 616 to turn on the light. In one embodiment, although claimed subject matter is not limited in this respect, such context-specific game logic may make such a determination based, at least in part, on a game state associated with the mobile device 12/14/16 and/or game participant. In response to the message initiated by the context-specific game logic, controller state machine 616 may instruct external device layer 618 to turn on the light. Accordingly, game state and/or location associated with a game participant and/or mobile device 12/14/16 may affect a response at an interactive installation including generation of a special effect such as turning on a light.

In another particular example, again for the purpose of illustration, a game state associated with a mobile device 12/14/16 and/or associated participant may change in response to the participant's interaction with an interactive installation 26. Here, sensors 604 and/or 624 may comprise an RFID reader and a pressure sensor placed on a target of a ball throwing game. A participant may be informed (e.g., from a message displayed on a mobile device 12/14/16) that his next assignment or task is to throw a ball at the target, thereby activating the pressure sensor. In response to detecting a change in pressure at the pressure sensor, controller state machine 616 may transmit a message to game server 602 to indicate that the target has been hit. Upon receiving an indication that the target had been hit, context-specific script logic hosted on game server 602 may initiate a request to a location server 40 for a list of participants and/or mobile devices in proximity to the target. Location server 40 may respond to such a request with an RFID code associated with the participant hitting the target with the ball. Based upon the received RFID code, context-specific game logic may determine whether it is appropriate for the participant associated with the RFID code to be at the ball throwing game based, for example, on a game state associated with the participant and/or associated mobile device 12/14/16. If appropriate, context-specific game logic may initiate transmission of a message to the mobile device for presentation of a response (e.g., text, audio and/or video and the like) indicating completion of the ball-throwing step and advance the mobile device and/or associated participant to a subsequent game state.

According to an embodiment, although claimed subject matter is not limited in this respect, game server 602 in combination with controller state machine 616 may coordinate interactive gaming to provide an experience between and/or among multiple participants. In one particular example, context-specific script logic hosted on game server 602 may have the participants work cooperatively to solve a problem or complete a task, mission or objective. Upon detection of multiple participants at an interactive installation and determining game states associated with the multiple participants, the context-specific script logic may direct the multiple participants to cooperatively interact with an interactive installation 26 to solve a problem, or complete a task, mission or objective.

According to an embodiment, although claimed subject matter is not limited in this respect, game server 602 may affect a game mechanic at an interactive installation 26 upon detecting multiple participants at the interactive installation 26. Such a game mechanic may comprise one or more rules intended to guide an outcome of game play. In one embodiment, a change in game mechanic may relate to changes in a task, mission and/or objective associated with one or more participants at a particular game state. In another embodiment, a change in game mechanic may relate to how an interactive installation 26 is to respond to actions of a game participant under certain conditions. In one example, a particular game state of a participant may imply a game mechanic requiring the participant to start a motor located at an interactive installation 26. As the participant approaches the motor, an RFID reader located at the motor may receive an RFID code associated with the participant. In response, context-specific script logic hosted on game server 602 may initiate transmission of a message to a mobile device 12/14/16 associated with the participant, prompting the participant to provide a "start motor" command as an input to the mobile device 12/14/16 (e.g., depressing a key) to start the motor. Upon receiving the start motor command from the mobile device 12/14/16, the context-specific game logic may initiate transmission of a message to controller state machine 616 to start the motor.

According to a particular embodiment, however, context-specific game logic may change this particular game mechanic in response to detection of multiple participants located at the motor having the particular game state (e.g., arriving to the motor simultaneously) by, for example, requiring action by the multiple participants to start the motor. For example, upon receiving a start motor command from one such participant in the absence of a timely start motor command from at least one of the other participants, context-specific game logic may initiate transmission of a message to mobile devices 12/14/16 associated with the multiple participants for presentation of an audio and/or visual message "your devices do not individually have sufficient power to start the motor, but they may collectively have sufficient power if you provide your start motor commands simultaneously." Upon receiving such simultaneous start motor commands from multiple mobile devices 12/14/16, the context specific game logic may initiate transmission of a message to controller state machine 616 to start the motor.

The above example illustrates a game mechanic coordinating two or more game participants at an interactive installation 26 as mutual allies based, at least in part, on locations of the one or more participants. In alternative embodiments, however, context-specific game logic may provide a game mechanic directing such co-located participants to act as opponents in affecting a game outcome. By affecting a game mechanic in such a coordinated fashion, the two or more participants may advance a game state associated with at least one of the participants and/or initiate presentation of one or more special effects. Here, for example, in response to detecting a presence of a game participant in an area while in a particular game state, context-specific game logic determines whether there are any additional game participants in the area in the same or similar game state. If such additional participants are in the area, context-specific game logic transmits a message to the multiple participants indicating that the multiple participants must act simultaneously to advance their respective game states. Context-specific game logic may then wait an arbitrary duration of time to receive inputs from the multiple game participants and advance their respective game states in response.

According to an embodiment, game server 38 may be adapted to alter an interactive gaming experience in real-time provided to multiple participants in an interactive gaming system according to a predetermined performance metric based, at least in part, on game participant specific information. Such game participant specific information may comprise, for example, information stored in a database obtained as part of a registration process (e.g., age, gender, place of residence, handicap status, etc.) In another embodiment, such game participant specific information may comprise, information indicative of behavior of at least one of the multiple participants. For example, with multiple participants roaming among interactive installations 26 as part of an interactive gaming experience, there is a possibility of collisions when multiple participants have game states requiring the participants to perform the same actions, in the same place and at the same time. It may be desirable to reduce the incidence of such collisions. Also, a theme park operator offering such an interactive gaming experience to attendees may desire to affect game play in a manner that assists with managing crowds in portions of the theme park.

In one particular example, a geographical area where interactive gaming is provided (e.g., a theme park) may be subdivided into game-play areas. Such game-play areas may be further subdivided into sub-missions. To reduce the incidence of collisions, long lines, bottlenecks in game-play areas, etc., as a new participant commences playing, context-specific game logic may assign the new participant to begin his first mission and/or complete his first task in a game-play area currently having the fewest players. Alternatively, context-specific game logic may assign the new participant to begin his first mission and/or complete his first task in a game-play area having the greatest dispersion of participant start-times and/or game-states. When a participant completes missions and/or tasks in one game-play area, context-specific game logic may perform additional calculations to direct the participant to another game-play area where there is a low likelihood of colliding with other participants.

In alternative embodiments, human technicians at terminals in communication with context-specific game logic may manually assign participants to game-areas and/or submissions as a new participant begins or as a participant completes missions and/or tasks in a game-area, for example. In another alternative embodiment, context-specific game logic may change or affect game play to prevent participants from colliding at an interactive installation 26. For example, if two participants having the same game state are likely to collide at an interactive installation 26, a mobile device 12/14/16 associated with a first one of the participants may receive a message initiated from context-specific game logic. The received message may present visual and/or audio instructions to wait for further instructions while the second participant is permitted to complete a task and/or mission without collision. Once the second participant progresses to the point of completing the task and/or mission without substantial risk of collision, for example, context-specific game logic may initiate a subsequent message to the first participant to present visual and/or audio instructions to proceed to complete the task.

In one embodiment, game server 38 may dynamically alter an interactive gaming experience in real-time for one or more game participants by changing an order of sub-missions associated with at least one of said one or more game participants. Here, such a re-ordering of sub-missions may reduce congestion and/or the likelihood of collisions at an interactive installation 26. In another embodiment, multiple participants may be associated into groups having an associated set of submissions. Here, game server 38 may dynamically alter an interactive gaming experience by changing an order of sub-missions associated with at least one of the groups of participants.

In other embodiments, a game server 38 may be adapted to alter an interactive gaming experience in aspects other than in reducing crowding and/or the frequency of collisions. In addition or as an alternative to affecting the routing of participants through game play in real-time, game server 38 may make other real-time adjustments to game play to alter performance based, at least in part, on game participant specific information. Such other adjustments may comprise, for example, making certain game objects and/or tasks easier or more difficult, changing help menus, altering paths between interactive installations to avoid collisions or attract participants to information unrelated to game play such as advertising, just to name a few examples.

According to an embodiment, game server 38 may be adapted to alter an interactive gaming experience for a game participant in real-time based, at least in part, on a handicap status associated with the game participant. For example, game server 38 may establish certain tasks, missions and/or objects requiring physical activity that is not feasible for a wheelchair bound participant. Such physical activity may comprise, for example, climbing a statue, jumping and kicking objects, just to name a few. Here, game server 38 may alter and/or bypass such missions to accommodate such a wheelchair bound participant based, at least in part, on registration information stored in a database, for example.

According to an embodiment, game server 38 may affect how participants are directed in real-time throughout game-play areas and/or sub-missions based, at least in part, on game participant specific information comprising logs of participant behavior (e.g., maintained in a database). In one embodiment, for example, such participant behavior may comprise an order in which one or more players have attempted to solve a series of game objectives. In another embodiment, such participant behavior may comprise time spent by one or more participants at game states. Here, such information regarding time spent by participants at particular games states may indicate a difficulty associated with completing certain objects or tasks to progress to a subsequent game state. Similarly, information regarding time spent by individuals to complete a full game may indicate a difficulty in completing the game.

According to an embodiment, a mobile device 12/14/16 associated with a participant may have camera functionality capable of capturing still and/or video images. Here, game server 38 may attempt to alter, in real-time, game play associated with one or more aspects of an interactive gaming experienced based, at least in part, on game participant specific information such as a number of images captured and/or posted to game server 38 by one or more game participants over a time period.

In another embodiment, game server 38 may collect game participant specific information comprising paths of game participants over a gaming area based, at least in part, on obtaining RFID codes associated with participants at dispersed RFID readers (e.g., located at interactive installations 26). Here, game server 38 may attempt to alter real-time game play of one or more aspects of an interactive gaming experience based, at least in part, on information descriptive of such paths over the gaming area.

In another embodiment, game server 38 may collect game participant specific information comprising a number of help requests at particular game states to evaluate the ease or difficulty associated with the particular game states. Also, game server 38 may track the number of times that particular participants have requested to skip over tasks and/or puzzles to similarly evaluate the ease or difficulty associated with particular game states.

According to an embodiment, information obtained from sensor technology alone may not be sufficient to evaluate a participant's performance in a game. A game task, mission and/or objective may comprise using a camera function of a mobile device 12/14/16 to take a digital photograph of an oak tree, or a task of using an audio recording function of a mobile device 12/14/16 to record a sound, etc., may be more reliably performed by a human being evaluating the photograph than by a feature recognition algorithm. By evaluating the participant's performance, the human judge, located at an operating terminal may transmit an "acceptance" message or a "denial" message to context-specific script logic hosted on a game server. Upon receipt of an acceptance message, for example, the context-specific logic script may advance the game participant and/or a mobile device 12/14/16 to a subsequent game state and initiate a message to the mobile device 12/14/16 for the display of the phrase "mission accomplished" on a mobile device display. Upon receipt of a denial message, on the other hand, the context-specific logic may not advance the game participant and/or mobile device 12/14/16 to a subsequent game state, and initiate transmission of a message to the mobile device 12/14/16 for the display of the phrase "try again," for example.

According to an embodiment, game server 38 may be adapted to alter in real-time an interactive gaming experience provided to one or more participants through interactive installations 26 dispersed geographically over a site based, at least in part, on one or more loading conditions. Such loading conditions may comprise, for example, availability of a resource such as power, water or personnel. Such loading conditions may also comprise customer demand indicated by, for example, a number of participants waiting in a queue to enter the site for interaction with the interactive installations 26. In one particular embodiment, game server 38 may monitor such loading conditions to enable such alterations to a gaming experience in real-time. Such alterations may, for example, enable the site to operate with reduced resources if the availability of such resources is constrained. Similarly, such alterations may comprise adjusting a rate at which participants progress through the interactive gaming experience.

Figure 7:
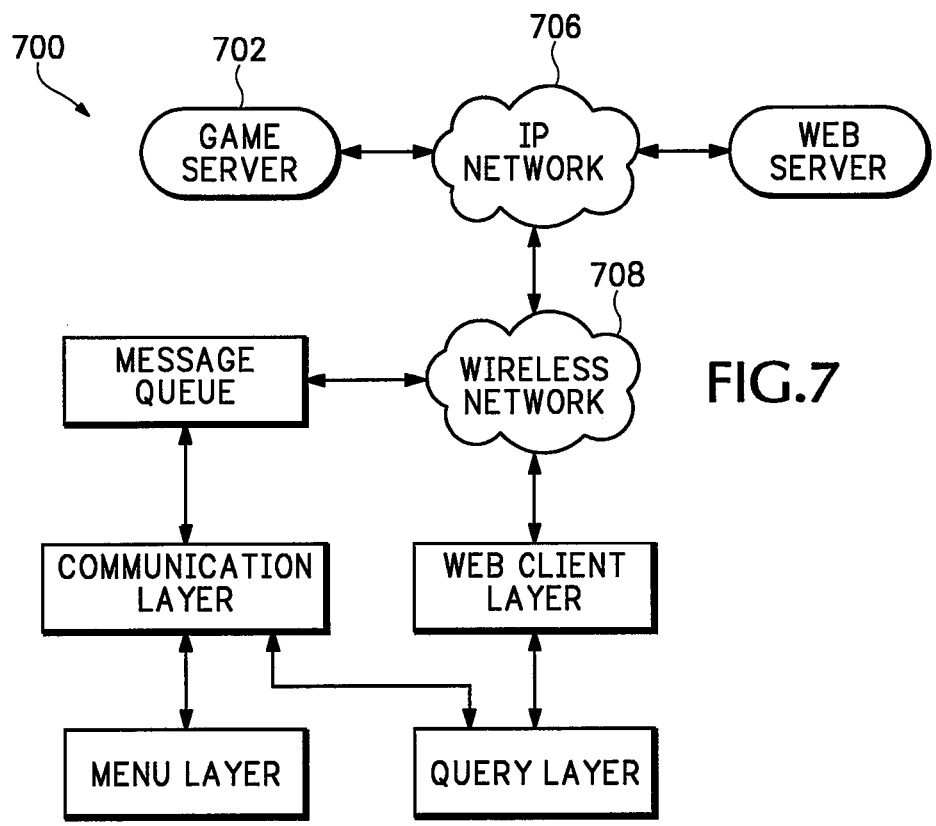
FIG. 7 is a schematic diagram illustrating interactions among software components to provide a human-mediated gaming experience according to an embodiment.

According to a particular embodiment, a human judge may provide inputs to a user interface of a human mediated gameplay terminal comprising a computing platform capable of communicating with a game server using, for example, a message on an IP network. In one particular embodiment, as illustrated in FIG. 7, human mediated gameplay terminal 44 and a human judge may be remotely located from the participant and/or interactive installation 26 where the participant is to perform a next task. Here, such a human mediated gameplay terminal 44 may communicate with game server 702 through IP network 706. Accordingly, when the participant arrives at the interactive installation 26 and/or is at a game state where a human judge is to evaluate the participant's attempt to complete a subsequent task, game server 702 (having knowledge of the location of the participant and/or associated mobile device) may transmit a message to an application hosted on the human mediated gameplay terminal 44 to announce an arrival of the participant. Here, game server 702 may detect a presence and/or arrival of the game participant by detection of a signature associated with the game participant using any of the aforementioned techniques. In one embodiment, upon detecting a game state, game server 702 may request and/or set location server 40 to provide an alert message in response to detecting that the participant is located in proximity to an interactive installation (e.g., by detecting an RFID code, barcode signature and/or biometric signature associated with the participant at the interactive installation).

As illustrated in FIG. 7, a human judge and human mediated gameplay terminal 44 may be located where a human judge may directly observe a participant completing a task. Here, for example, such a human mediated gameplay terminal 44 may comprise a mobile communication device (not shown) that is capable of communicating with game server 702 through wireless network 708. An application hosted on the mobile communication device may register the device with a game server as a human mediated gameplay terminal. When a participant approaches an interactive installation, a game server may detect the participant's location as being proximate to the interactive installation by communicating with a location server 40 and notify the human mediated gameplay terminal. Here, the game server may also provide additional information regarding the participant such as, for example, the participant's name, game state and photograph, for example. Upon observing a participant's attempt to complete a task, the human judge may select information representing the participant from a user interface of the human mediated gameplay terminal. Upon observing an attempt to complete a particular task, the human judge may then make a subsequent selection to the user interface of the human mediated gameplay terminal to send an acceptance or denial message to the game server.

Figure 8:
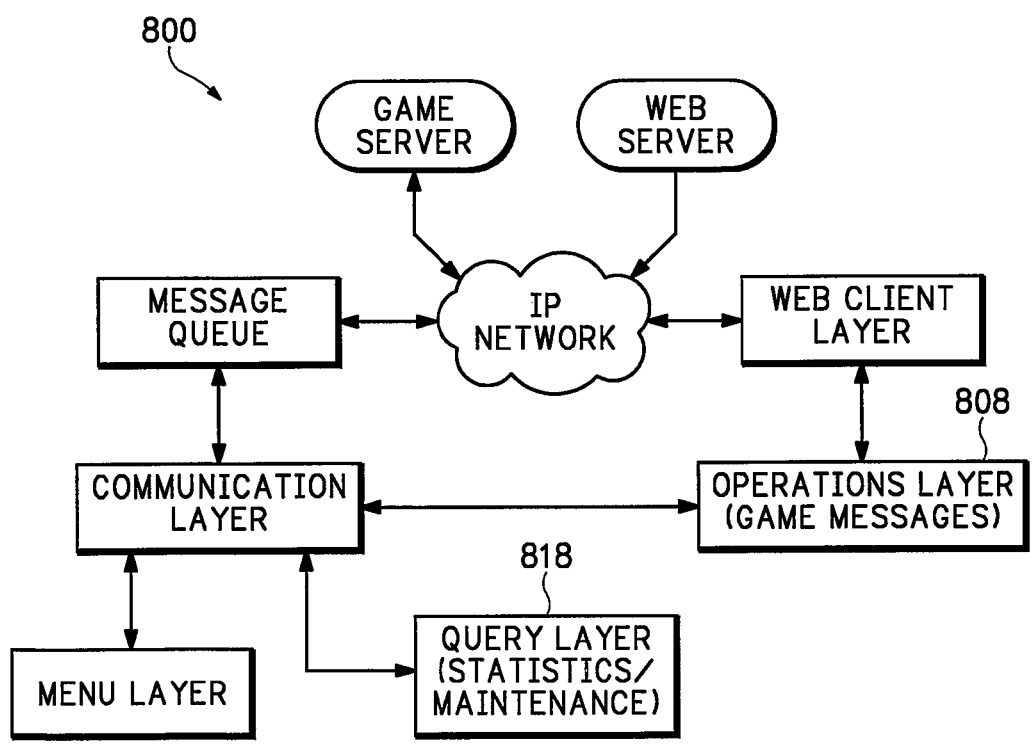
FIG. 8 is a schematic diagram illustrating interactions among software components to provide a human-mediated gaming experience according to an embodiment.

Alternatively, as illustrated in FIG. 8, information collected at an interactive installation 26 in connection with a game participant may be provided to human mediated gameplay terminal 44 to evaluate remotely. Here, the human judge may be remotely located from the interactive installation but may be able to view media content such as video, audio and still imagery provided to a remote terminal via operations layer 808. The human judge may then evaluate information through query layer 818 provided by the interactive installation 26 relating to performance of the participant in attempting to complete the subsequent task and initiate action to provide an acceptance or denial message to context-specific game logic hosted on the game server.

References are made herein to "servers" capable of providing resources over a data communication network. Such resources may comprise, for example, stored information and/or computational resources. Accordingly, a server may comprise one or more computing platforms comprising, for example, one or more processors coupled to a storage medium or memory by a data bus. In a particular example, such a computing platform may be adapted to execute machine-readable instructions stored in a memory for executing procedures to implement claimed subject matter. Likewise, mobile devices identified herein may comprise computing platforms adapted to implement one or more aspects of claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
receiving one or more inputs from one or more mobile devices, the one or more inputs being based on one or more game participant selections;
receiving location data of said one or more mobile devices;
providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a display screen;
maintaining game participant specific information associated with at least one of said one or more game participants; and
altering said interactive gaming experience in real-time according to a predetermined performance metric based, at least in part, on said game participant specific information, said predetermined performance metric relating to progress, or lack of progress, through multiple stages of said interactive gaming experience via one or more interactions at said one or more interactive installations.

2. The method of claim 1, wherein said game participant specific information comprises an order in which at least one of said one or more game participants attempted to complete a game objective.

3. The method of claim 1, wherein said altering said interactive gaming experience comprises changing a game mechanic associated with said one or more interactive installations.

4. The method of claim 1, wherein said game participant specific information comprises behavior associated with said one or more game participants.

5. The method of claim 1, wherein said game participant specific information comprises a physical handicap status of at least one of said one or more game participants.

6. The method of claim 1, wherein said game participant specific information comprises time spent by at least one of said one or more game participants in one or more game states.

7. The method of claim 1, wherein said game participant specific information comprises a count of images captured on at least a portion of said one or more mobile devices.

8. The method of claim 7, wherein said game participant specific information is further representative of a count of said captured images which are posted by at least one of said one or more game participants.

9. The method of claim 1, wherein said game participant specific information is representative of one or more paths taken past RFID readers located at said one or more interactive installations.

10. The method of claim 1, wherein said game participant specific information comprises a count of help requests associated with one or more game states in said interactive gaming experience.

11. The method of claim 1, wherein said game participant specific information comprises a count of a number of skip game state requests associated with a particular game state.

12. The method of claim 1, wherein said game participant specific information comprises information identifying game participant collisions and game states associated with said game participant collisions.

13. The method of claim 1, wherein said altering said interactive gaming experience comprises changing an order of sub-missions associated with at least one of said one or more game participants.

14. The method of claim 1, and further comprising grouping said one or more game participants into a plurality of groups having an associated set of sub-missions, and wherein said altering said interactive gaming experience comprises changing an order of sub-missions associated with at least one group of said plurality of groups.

15. The method of claim 1, wherein said altering said interactive gaming experience comprises preventing collisions of said one or more game participants.

16. The method of claim 1, wherein said altering said interactive gaming experience comprises making one or more objectives, tasks and/or missions of said interactive gaming experience easier.

17. The method of claim 1, wherein said altering said interactive gaming experience comprises making one or more objectives, tasks and/or missions of said interactive gaming experience more difficult.

18. The method of claim 1, wherein said game participant specific information comprises a gender of at least one of said one or more game participants.

19. The method of claim 1, wherein said game participant specific information comprises a birth date of at least one of said one or more game participants.

20. The method of claim 1, wherein said game participant specific information comprises a food allergy of at least one of said one or more game participants.

21. The method of claim 1, wherein said game participant specific information comprises an age of at least one of said one or more game participants.

22. An apparatus comprising:
a computing platform, said computing platform being adapted to:
receive one or more inputs from one or more mobile devices, the one or more inputs being based on one or more game participant selections;
receive location data of said one or more mobile devices;

providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a display screen;
maintain game participant specific information associated with at least one of said one or more game participants; and
alter said interactive gaming experience in real-time according to a predetermined performance metric based, at least in part, on said game participant specific information, said predetermined performance metric relating to progress, or lack of progress, through multiple stages of said interactive gaming experience via one or more interactions at said one or more interactive installations.

23. The apparatus of claim 22, wherein said game participant specific information comprises an order in which at least one of said one or more game participants attempted to complete a game objective.

24. The apparatus of claim 22, wherein said computing platform is adapted to alter said interactive gaming experience by changing a game mechanic associated with said one or more interactive installations.

25. The apparatus of claim 22, wherein said game participant specific information comprises a physical handicap status of at least one of said one or more game participants.

26. An apparatus comprising:
means for receiving one or more inputs from one or more mobile devices, the one or more inputs being based on one or more game participant selections;
means for receiving location data of said one or more mobile devices;
means for providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a display screen;
means for maintaining game participant specific information associated with at least one of said one or more game participants; and
means for altering said interactive gaming experience in real-time according to a predetermined performance metric based, at least in part, on said game participant specific information, said predetermined performance metric relating to progress, or lack of progress, through multiple stages of said interactive gaming experience via one or more interactions at said one or more interactive installations.

27. The apparatus of claim 26, wherein said means for altering said interactive gaming experience comprises means for changing a game mechanic associated with said one or more interactive installations.

28. The apparatus of claim 26, wherein said game participant specific information comprises behavior associated with said one or more game participants.

29. The apparatus of claim 26, wherein said game participant specific information comprises a physical handicap status of at least one of said one or more game participants.

30. A method comprising:
receiving one or more inputs from one or more mobile devices, the one or more inputs being based on one or more game participant selections;
receiving location data of said one or more mobile devices;
providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a screen that is capable of displaying text;
maintaining game participant specific information associated with at least one of said one or more game participants; and
altering said interactive gaming experience in real-time according to a predetermined performance metric based, at least in part, on said game participant specific information,
wherein said game participant specific information comprises an order in which at least one of said one or more game participants attempted to complete a game objective at said one or more interactive installations.

31. A method comprising:
receiving one or more inputs from one or more mobile devices, the one or more inputs being based on one or more game participant selections;
receiving location data of said one or more mobile devices;
providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a screen that is capable of displaying text;
maintaining game participant specific information associated with at least one of said one or more game participants; and
altering said interactive gaming experience in real-time according to a predetermined performance metric based, at least in part, on said game participant specific information,
wherein said altering said interactive gaming experience comprises making one or more objectives, tasks and/or missions of said interactive gaming experience easier at said one or more interactive installations.

32. A method comprising:
receiving one or more inputs from one or more mobile devices, the one or more inputs being based on one or more game participant selections;
receiving location data of said one or more mobile devices;
providing an interactive gaming experience to one or more game participants associated with said one or more mobile devices at one or more interactive installations located at one or more locations indicated by said location data based upon said one or more inputs, said one or more mobile devices being distinct from said one or more interactive installations, individual ones of said one or more mobile devices including a display screen;
maintaining game participant specific information associated with at least one of said one or more game participants; and altering said interactive gaming experience in real-time according to a predetermined performance metric based, at least in part, on said game participant specific information, wherein said altering said interactive gaming experience comprises making one or more objectives, tasks and/or missions of said interactive gaming experience more difficult at said one or more interactive installations.

* * * * *